United States Patent
Ganti et al.

(10) Patent No.: US 11,941,038 B2
(45) Date of Patent: Mar. 26, 2024

(54) TRANSPARENT AND CONTROLLABLE TOPIC MODELING

(71) Applicant: INTERNATIONAL BUSINESS MACHINES CORPORATION, Armonk, NY (US)

(72) Inventors: Raghu Kiran Ganti, White Plains, NY (US); Mudhakar Srivatsa, White Plains, NY (US); Shreeranjani Srirangamsridharan, San Jose, CA (US); Jae-Wook Ahn, Nanuet, NY (US); Michele Merler, New York City, NY (US); Dean Steuer, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 17/748,263

(22) Filed: May 19, 2022

(65) Prior Publication Data

US 2023/0376518 A1 Nov. 23, 2023

(51) Int. Cl.
*G06F 16/35* (2019.01)
*G06F 40/30* (2020.01)
*G06F 40/40* (2020.01)

(52) U.S. Cl.
CPC ............ *G06F 16/358* (2019.01); *G06F 40/30* (2020.01); *G06F 40/40* (2020.01)

(58) Field of Classification Search
CPC ........ G06F 16/358; G06F 40/30; G06F 40/40; G06F 40/284
See application file for complete search history.

(56) References Cited

U.S. PATENT DOCUMENTS 10,558,657 B1 2/2020 Cheng
10,558,679 B2 2/2020 Chiu
(Continued)

OTHER PUBLICATIONS

Beykikhoshk et al., "Discovering topic structures of a temporally evolving document corpus", Knowl Inf Syst (2018) 55:599-632, Published online: Aug. 10, 2017, pp. 599-632.
(Continued)

*Primary Examiner* — Albert M Phillips, III
(74) *Attorney, Agent, or Firm* — Andre Adkins

(57) ABSTRACT

Systems, methods and/or computer program products for controlling and visualizing topic modeling results using a topic modeling interface. The interface allows user directed exploration, understanding and control of topic modeling algorithms, while offering both semantic summaries and/or structure attribute explanations about results. Explanations and differentiations between results are presented using metrics such as cohesiveness and visual displays depicting hierarchical organization. Through user-manipulation of features of the interface, iterative changes are implemented through user-feedback, adjusting parameters, broadening or narrowing topic results, and/or reorganizing topics by splitting or merging topics. As users trigger visual changes to results being displayed, users can compare and contrast output from the topic modeling algorithm. With each change to parameters, users view different explanations informing the user why the changes being displayed occurred, providing users deeper understanding of the topic modeling process, how to manipulate parameters to achieve accurate topic results and adjust granularity of information presented.

20 Claims, 13 Drawing Sheets

(56) References Cited

U.S. PATENT DOCUMENTS

| | | | |
|---|---|---|---|
| 10,803,399 | B1 | 10/2020 | Cohen |
| 10,990,620 | B2 | 4/2021 | Peng |
| 10,990,763 | B2 | 4/2021 | Peterson |
| 11,080,348 | B2 | 8/2021 | Chen |
| 11,669,556 | B1* | 6/2023 | Hasan .............. G06F 16/9024 707/736 |
| 2019/0102455 | A1* | 4/2019 | Radhakrishnan ..... G06F 40/284 |
| 2020/0293565 | A1* | 9/2020 | Shah ...................... G06N 20/00 |
| 2020/0356633 | A1* | 11/2020 | Garlapati ............ G06F 16/287 |
| 2020/0380385 | A1 | 12/2020 | Li |
| 2020/0401663 | A1 | 12/2020 | Goldbraich |
| 2021/0056472 | A1 | 2/2021 | Stickler |
| 2021/0103608 | A1 | 4/2021 | Ganti |
| 2021/0397639 | A1 | 12/2021 | Jacob |
| 2022/0036010 | A1 | 2/2022 | Sengupta |
| 2022/0068153 | A1* | 3/2022 | Harlow .................. G06F 40/30 |

OTHER PUBLICATIONS

Bianchi et al., "Pre-training is a Hot Topic: Contextualized Document Embeddings Improve Topic Coherence", arXiv:2004.03974v2 [cs.CL], Jun. 17, 2021, 8 pages.

Choo et al., "UTOPIAN: User-Driven Topic Modeling Based On Interactive Nonnegative Matrix Factorization", IEEE Transactions On Visualization and Computer Graphics, vol. 19, No. 12, Dec. 2013, Doi: 10.1109/TVCG.2013.212, pp. 1992-2001.

Chuang et al., "Termite: Visualization Techniques for Assessing Textual Topic Models", AVI '12, May 21-25, 2012, Capri Island, Italy, pp. 74-77.

El-Assady et al., "Progressive Learning Of Topic Modeling Parameters: A Visual Analytics Framework", IEEE Transactions On Visualization and Computer Graphics, vol. 24, No. 1, Jan. 2018, Digital Object Identifier No. 10.1109/TVCG.2017.2745080, pp. 382-391.

Gao et al., "Tracking and Connecting Topics via Incremental Hierarchical Dirichlet Processes", 2011 11th IEEE International Conference on Data Mining, DOI 10.1109/ICDM.2011.148, pp. 1056-1061.

Kim et al., "ArchiText: Interactive Hierarchical Topic Modeling", IEEE Transactions on Visualization and Computer Graphics, 2020, DOI 10.1109/TVCG.2020.2981456, 12 pages.

Kim et al., "TopicSifter: Interactive Search Space Reduction Through Targeted Topic Modeling", arXiv:1907.12079v1 [cs.IR], Jul. 28, 2019, 11 pages.

Lisena et al., "ToModAPI: A Topic Modeling API to Train, Use and Compare Topic Models", Proceedings of Second Workshop for NLP Open Source Software (NLP-OSS), Virtual Conference, Nov. 19, 2020, pp. 132-140.

Mell et al., "The NIST Definition of Cloud Computing", Recommendations of the National Institute of Standards and Technology, Special Publication 800-145, Sep. 2011, 7 pages.

O'Callaghan et al., "An analysis of the coherence of descriptors in topic modeling", Expert Systems with Applications, Available online Mar. 9, 2015, pp. 5645-5657.

Peinelt et al., "tBERT: Topic Models and BERT Joining Forces for Semantic Similarity Detection", Proceedings of the 58th Annual Meeting of the Association for Computational Linguistics, Jul. 5-10, 2020, pp. 7047-7055.

Sievert et al., "LDAvis: A method for visualizing and interpreting topics", Proceedings of the Workshop on Interactive Language Learning, Visualization, and Interfaces, 2014, pp. 63-70.

Smith et al., "Closing the Loop: User-Centered Design And Evaluation of a Human-in-the-Loop Topic Modeling System", IUI 2018, Mar. 7-11, 2018, Tokyo, Japan, 12 pages, <https://doi.org/10.1145/3172944.3172965>.

Syed et al., "Full-Text or Abstract? Examining Topic Coherence Scores Using Latent Dirichlet Allocation", International Conference on Data Science and Advanced Analytics, 2017, DOI 10.1109/DSAA.2017.61, pp. 165-174.

Yang et al., "VISTopic: A visual analytics system for making sense of large document collections using hierarchical topic modeling", Visual Informatics, Available online Jan. 18, 2017, pp. 40-47.

\* cited by examiner

TRANSPARENT AND CONTROLLABLE TOPIC MODELING

BACKGROUND

The present disclosure relates generally to the field of topic modeling, and more specifically to a user-friendly topic modeling interface that allows users to intuitively understand, evaluate, explore and adjust the topic modeling results.

Topic modeling is a machine learning technique that can be used to scan a set of documents, detect words and/or phrase patterns within the set of documents and automatically cluster groups of words and similar expressions together in a manner that an algorithm may determine to be the best characterization of the document set. Topic modeling is an "unsupervised" machine learning technique. The model does not require training before being deployed, unlike topic classification which is "supervised" and does require training before being able to automatically analyze the text of documents. Topic modeling often involves counting words and grouping similar word patterns in order to infer topics within unstructured data (i.e., the text documents). By detecting patterns such as word frequency and the distance between words, topic models can cluster similar ideas found within the analyzed documents together, along with similar words and expressions that may appear most often. From the clusters that are created by the topic modeling algorithm, users can deduce what each set of texts are talking about, without having to manually read each and every document. The most popular algorithms for modeling may include Latent Dirichlet Allocation (LDA), Non-Negative Matrix Factorization (NMF), Latent Semantic Analysis (LSA), Parallel Latent Dirichlet Allocation (PLDA) and Pachinko Allocation Model (PAM).

Natural language processing (NLP) refers to a branch of artificial intelligence focused on giving computers the ability to understand text and spoken words in a manner similar to human beings. NLP combines computational linguistics and deep learning models. Together, these technologies can enable computers to process human language in the form of text or voice data and 'understand' the full meaning, complete with the speaker or writer's intent and sentiment. Several NLP tasks may be used together to help break down text and voice data in a way that helps the computer make sense of the data being ingested. Such NLP tasks can include speech recognition, part of speech tagging, word sense disambiguation, named entity recognition, co-reference resolution, sentiment analysis and natural language generation.

SUMMARY

Embodiments of the present disclosure relate to a computer-implemented method, an associated computer system and computer program products for understanding and controlling results of a topic modeling algorithm. The computer-implemented method comprises: inputting a dataset into a topic modeling algorithm configured for hierarchical clustering analysis and natural language processing (NLP) of the dataset; generating a set of clusters based on a first set of parameters inputted into the topic modeling algorithm, wherein each cluster represents a topic identified from the dataset; outputting an interactive two-dimensional (2D) spatial distribution of the set of clusters to a user interface, wherein the interactive 2D spatial distribution is obtained through a multidimensional scaling of semantic embeddings, and nodes of the interactive 2D spatial distribution each represent a cluster of the set of clusters and distances between the nodes depicts a level of similarity between topics represented by the nodes; selecting a first node of the interactive 2D spatial distribution being displayed by the user interface; and in response to selecting the first node of the interactive 2D spatial distribution, visually generating an individual topic view of the first node, wherein the individual topic view includes a semantic summary explaining topic definitions for the first node and structural attributes explaining how the topic of the first node differs from remaining nodes of the 2D spatial distribution.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1:
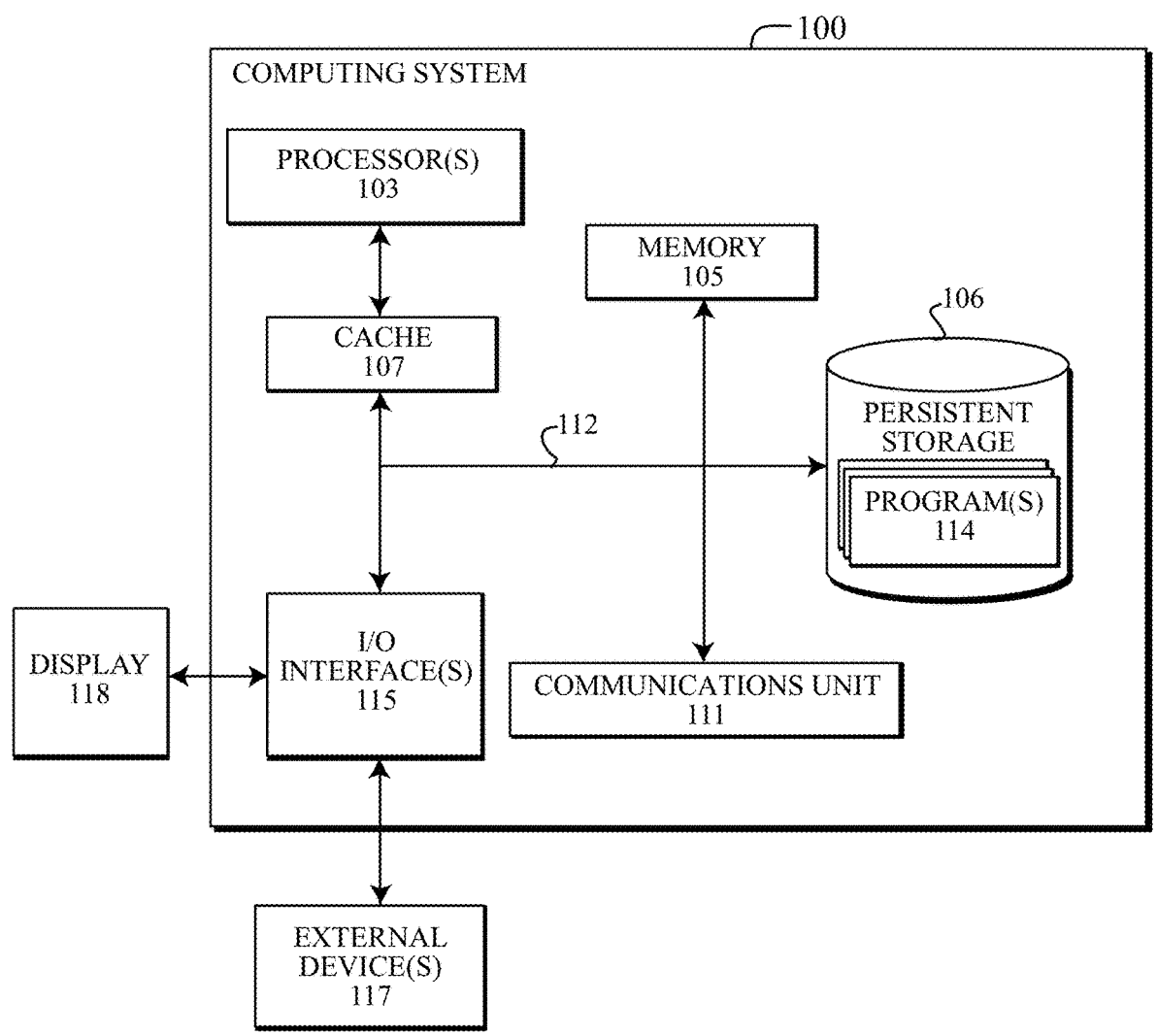
FIG. 1 depicts a block diagram illustrating an embodiment of a computing system and the internal and external components thereof, upon which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

Typical topic modeling algorithms can identify semantic topics from large data sets, including conversation transcripts and system logs. For example, using conversation analytics and log analysis to identify topics from the inputted transcripts and logs. Unfortunately, existing topic modeling algorithms can usually appear as a black-box solution to most users. In other words, the topic modeling solutions may output results that are difficult for user to understand how results were generated. The output from these topic modeling solutions can be difficult to manipulate and control results (if manipulation or control are even allowed at all), particularly when the user lacks the understanding of how the topic modeling algorithm achieves the results being displayed. Existing user interfaces (UI) are often a simple UI wrapper that provides users a rudimentary ability to manipulate algorithm parameters, however, such simple UIs lack the ability to provide an explanation of how the topic model identifies existing topics from the inputted collection of data, nor do the existing UIs offer users an ability to control, select and/or modify the outputted topics directly via the interface. Moreover, existing topic modeling interfaces lack a feedback mechanism that would allow users to see direct impacts of user decisions and manipulation of the topic modeling algorithm, thus making it difficult for users to understand how their feedback affects topic modeling results when there is a lack of comparative analysis between a first set of topic modeling results using a first set of parameters and a second set of topic modeling results after adjusting one or more parameters.

Embodiments of the present disclosure recognize a need for a topic modeling interface that allows for intuitive user directed exploration, understanding and control of the topic modeling algorithm, allowing the user to achieve the desired results of the user. Embodiments of the topic modeling interface provides both a semantic summary and structure attribute explanations to users about the topic modeling task. The semantic summary can explain the topical definition through the use of various natural language processing techniques such as part-of-speech (POS) annotated keyword, ngrams, and analysis of sentences from the collection of documents being modeled. Simultaneously alongside the semantic summary, the structural attributes of the topic modeling results can be explained and differentiated from each other based on metrics such as cohesiveness scores and through a visual display showing how the topics are organized hierarchically by the topic modeling algorithm.

Embodiments of the topic modeling algorithms and the modeling interface provide intuitive user controls that allows the user to manipulate parameters and topics presented by the interface, as the user explores the topic modeling results. By manipulating features and functions of the topic modeling interface, the user can provide feedback to the topic modeling algorithm using an iterative process that incorporates the users feedback and changes via the UI. The user can manipulate and modify topic modeling results by adjusting parameters (such as the topic size threshold, feature weights, etc.), broaden or narrow topic results, and/or reorganize topics by splitting or merging topics directly using the interface. Moreover, through the topic modeling user interface, the user can compare and contrast different topic modeling results as the parameters are changed by the user. The user can visually explore and see the different visual elements representing the clustering results based on different sets of parameters. With each change to the sets of parameters, users can view the different explanations informing the user why the changes being displayed have occurred, resulting in the user having a deeper understanding of the topic modeling process, how to manipulate the parameters to achieve the user's intended topic modeling results and adjust granularity of information being presented by the modeling results.

Computing System

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1 illustrates a block diagram describing an embodiment of a computing system 100, which may be a simplified example of a computing device (i.e., a physical bare metal system and/or a virtual system) capable of performing the computing operations described herein. Computing system 100 may be representative of the one or more computing systems or devices implemented in accordance with the embodiments of the present disclosure and further described below in detail. It should be appreciated that FIG. 1 provides only an illustration of one implementation of a computing system 100 and does not imply any limitations regarding the environments in which different embodiments may be implemented. In general, the components illustrated in FIG. 1 may be representative of any electronic device, either physical or virtualized, capable of executing machine-readable program instructions.

Although FIG. 1 shows one example of a computing system 100, a computing system 100 may take many different forms, including bare metal computer systems, virtualized computer systems, container-oriented architecture, microservice-oriented architecture, etc. For example, computing system 100 can take the form of a desktop computer system or workstation, laptops, notebooks, tablets, servers, client devices, network devices, network terminals, thin clients, thick clients, kiosks, mobile communication devices (e.g., smartphones), multiprocessor systems, microprocessor-based systems, minicomputer systems, mainframe computer systems, smart devices, and/or Internet of Things (IoT) devices. The computing systems 100 can operate in a local computing environment, networked computing environment, a containerized computing environment comprising one or more pods or clusters of containers, and/or a distributed cloud computing environment, which can include any of the systems or devices described herein and/or additional computing devices or systems known or used by a person of ordinary skill in the art.

Computing system 100 may include communications fabric 112, which can provide for electronic communications among one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, CPUs, and network processors, etc.), memory 105, external devices 117, and any other hardware components within a computing system 100. For example, communications fabric 112 can be implemented as one or more buses, such as an address bus or data bus.

Memory 105 and persistent storage 106 may be computer-readable storage media. Embodiments of memory 105 may include random access memory (RAM) and/or cache 107 memory. In general, memory 105 can include any suitable volatile or non-volatile computer-readable storage media and may comprise firmware or other software programmed into the memory 105. Program(s) 114, application(s), processes, services, and installed components thereof, described herein, may be stored in memory 105 and/or persistent storage 106 for execution and/or access by one or more of the respective processor(s) 103 of the computing system 100.

Persistent storage 106 may include a plurality of magnetic hard disk drives, solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between computing systems 100. For example, between one or more computer systems or devices via a communication network. In the exemplary embodiment, communications unit 111 may include network adapters or interfaces such as a TCP/IP adapter cards, wireless interface cards, or other wired or wireless communication links. Communication networks can comprise, for example, copper wires, optical fibers, wireless transmission, routers, load balancers, firewalls, switches, gateway computers, edge servers, and/or other network hardware which may be part of, or connect to, nodes of the communication networks including devices, host systems, terminals or other network computer systems. Software and data used to practice embodiments of the present disclosure can be downloaded to the computing systems 100 operating in a network environment through communications unit 111 (e.g., via the Internet, a local area network, or other wide area networks). From communications unit 111, the software and the data of program(s) 114 or application(s) can be loaded into persistent storage 106.

One or more I/O interfaces 115 may allow for input and output of data with other devices that may be connected to computing system 100. For example, I/O interface 115 can provide a connection to one or more external devices 117 such as one or more smart devices, IoT devices, recording systems such as camera systems or sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, computer monitors or screens. For example, by displaying data as part of a graphical user interface (GUI). Human-readable display 118 can also be an incorporated display and may function as a touch screen, such as a built-in display of a tablet computer.

Figure 2:
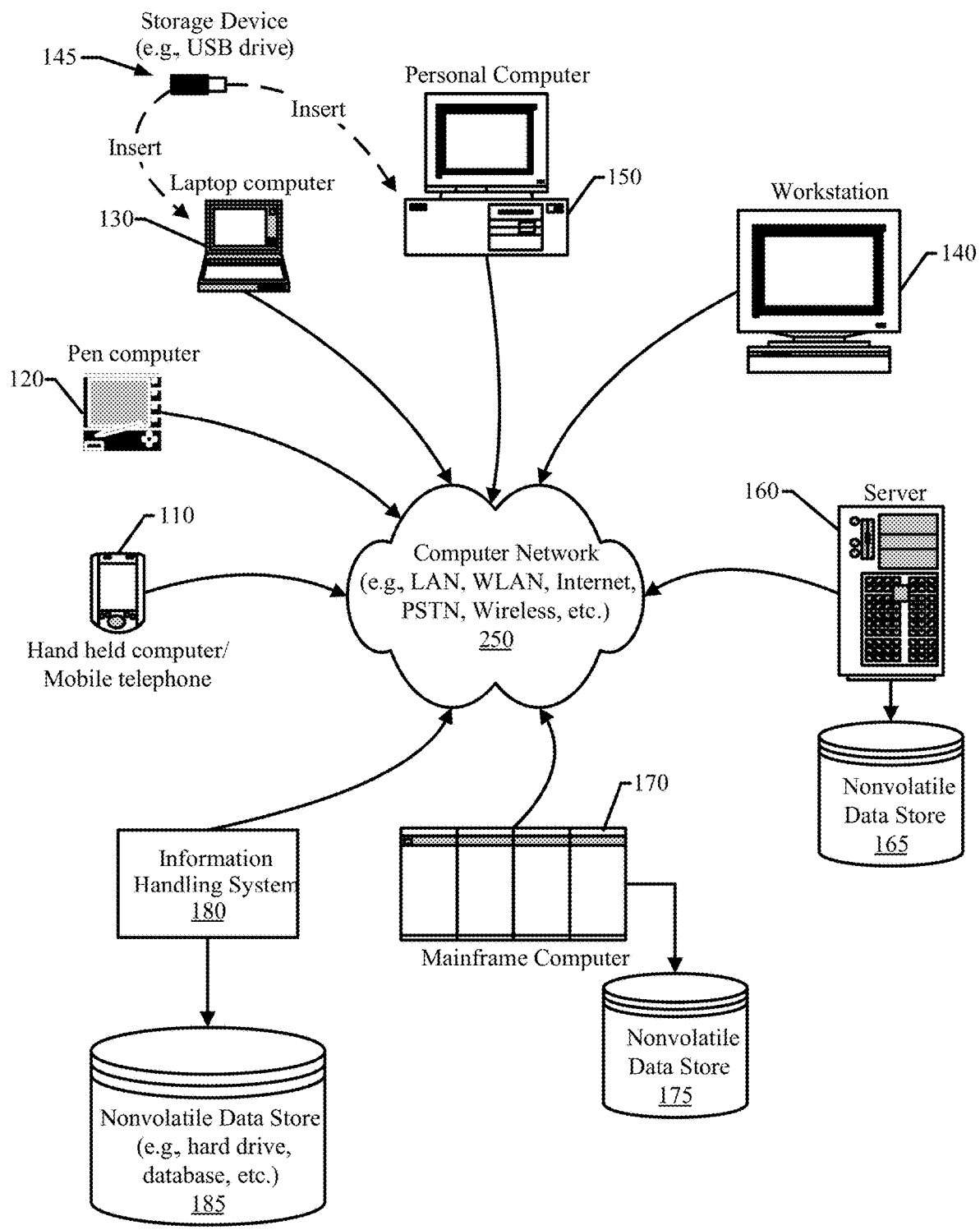
FIG. 2 depicts a block diagram illustrating an extension of the computing system environment of FIG. 1, wherein the computing systems are configured to operate in a network environment and perform methods described herein in accordance with the present disclosure.

FIG. 2 provides an extension of the computing system 100 environment shown in FIG. 1 to illustrate that the methods described herein can be performed on a wide variety of computing systems that operate in a networked environment. Types of computing systems 100 may range from small handheld devices, such as handheld computer/mobile telephone 110 to large mainframe systems, such as mainframe computer 170. Examples of handheld computer 110 include personal digital assistants (PDAs), personal entertainment devices, such as Moving Picture Experts Group Layer-3 Audio (MP3) players, portable televisions, and compact disc players. Other examples of information handling systems include pen, or tablet computer 120, laptop or notebook computer 130, workstation 140, personal computer system 150, and server 160. Other types of information handling systems that are not individually shown in FIG. 2 are represented by information handling system 180.

Many of the computing systems can include nonvolatile data stores, such as hard drives and/or nonvolatile memory. The embodiment of the information handling system shown in FIG. 2 includes separate nonvolatile data stores (more specifically, server 160 utilizes nonvolatile data store 165, mainframe computer 170 utilizes nonvolatile data store 175, and information handling system 180 utilizes nonvolatile data store 185). The nonvolatile data store can be a component that is external to the various computing systems or can be internal to one of the computing systems. In addition, removable nonvolatile storage device 145 can be shared among two or more computing systems using various techniques, such as connecting the removable nonvolatile storage device 145 to a USB port or other connector of the computing systems. In some embodiments, the network of computing systems 100 may utilize clustered computing and components acting as a single pool of seamless resources when accessed through network 250 by one or more computing systems. For example, such embodiments can be used in a datacenter, cloud computing network, storage area network (SAN), and network-attached storage (NAS) applications.

As shown, the various computing systems 100 can be networked together using computer network 250 (referred to herein as "network 250"). Types of networks 250 that can be used to interconnect the various information handling systems include Local Area Networks (LANs), Wireless Local Area Networks (WLANs), home area network (HAN), wide area network (WAN), backbone networks (BBN), peer to peer networks (P2P), campus networks, enterprise networks, the Internet, single tenant or multi-tenant cloud computing networks, the Public Switched Telephone Network (PSTN), and any other network or network topology known by a person skilled in the art to interconnect computing systems 100.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
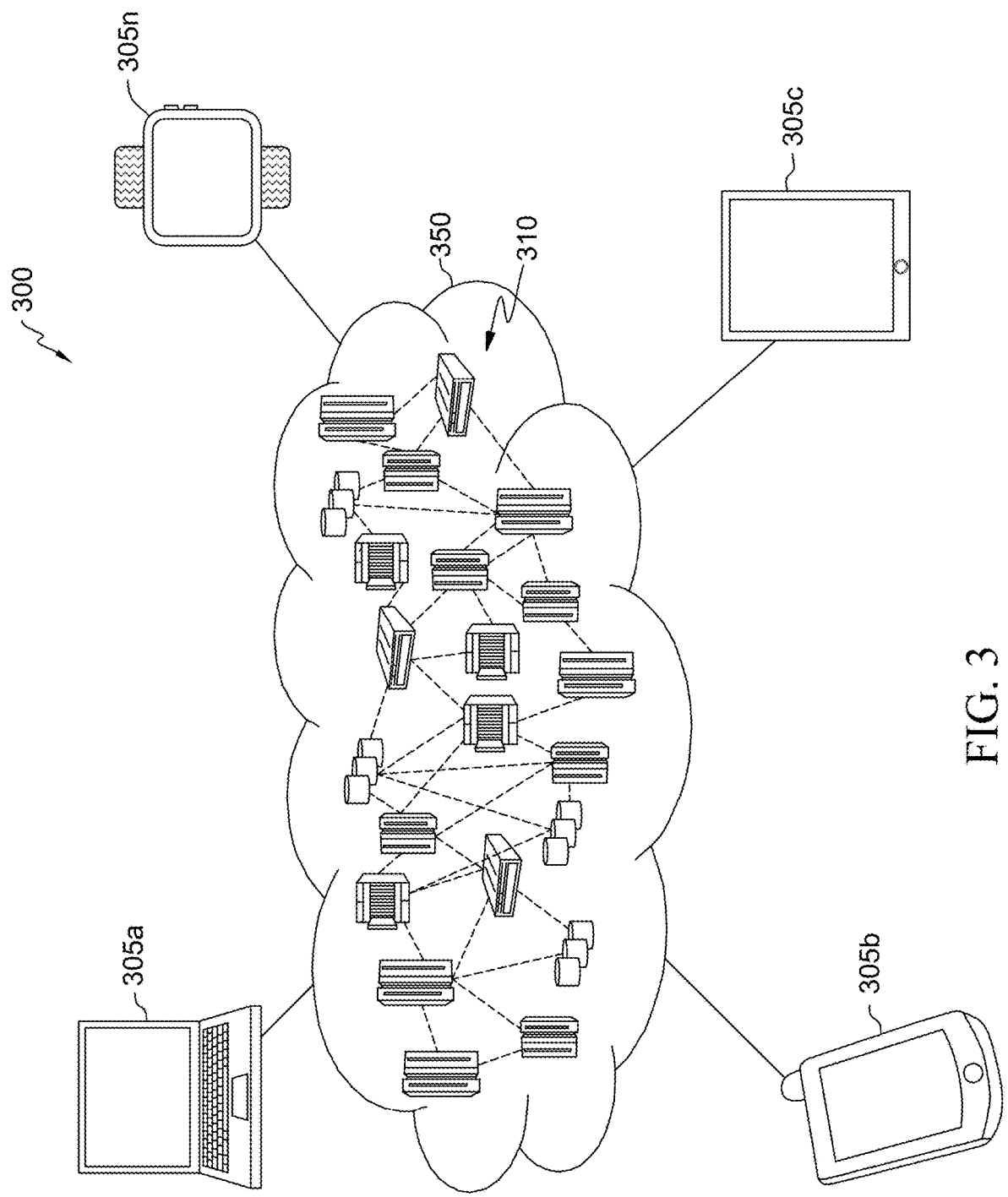
FIG. 3 depicts a block diagram illustrating a cloud computing environment in accordance with the present disclosure.

Referring to the drawings, FIG. 3 is an illustrative example of a cloud computing environment 300. As shown, cloud computing environment 300 includes a cloud network 350 comprising one or more cloud computing nodes 310 with which end user device(s) 305a-305n (referred to generally herein as end user device(s) 305) or client devices, may be used by cloud consumers (i.e., user(s) 501) to access one or more software products, services, applications, and/or workloads provided by cloud service providers or tenants of the cloud network 350. Examples of the user device(s) 305 are depicted and may include devices such as a desktop computer, laptop computer 305*a*, smartphone 305*b* or cellular telephone, tablet computers 305*c* and smart devices such as a smartwatch 305*n* and smart glasses. Nodes 310 may communicate with one another and may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of end user devices 305 shown in FIG. 3 are intended to be illustrative only and that computing nodes 310 of cloud computing environment 300 can communicate with any type of computerized device over any type of network and/or network addressable connection (e.g., using a web browser).

Figure 4:
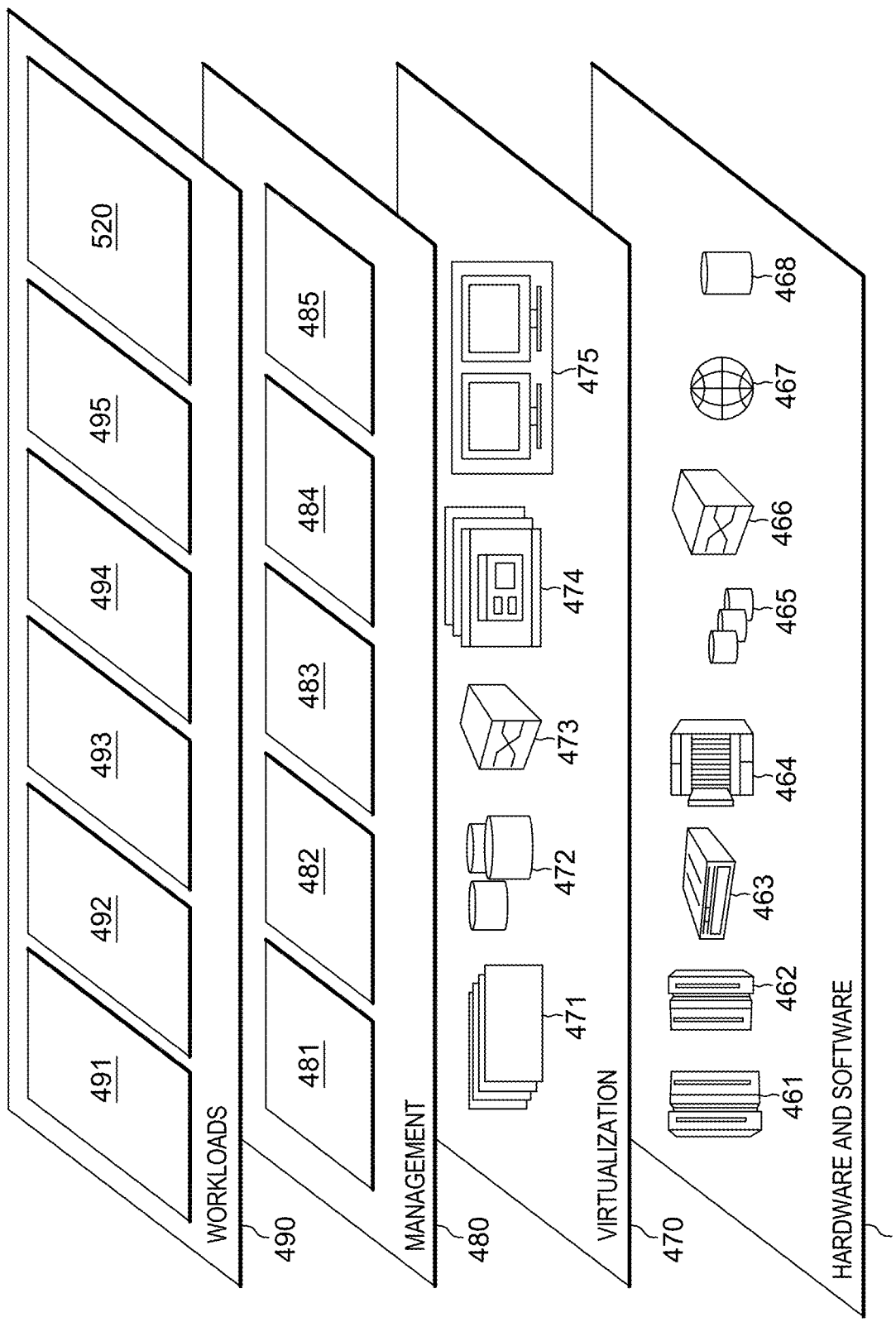
FIG. 4 depicts an embodiment of abstraction model layers of a cloud computing environment in accordance with the present disclosure.

Referring now to FIG. 4, a set of functional abstraction layers provided by cloud computing environment 300 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

Management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include software development and lifecycle management 491, data analytics processing 492, multi-cloud management 493, transaction processing 494; database management 495 and topic modeling module 520.

System for Controlling and Visualizing Topic Modeling Results

It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Figure 5:
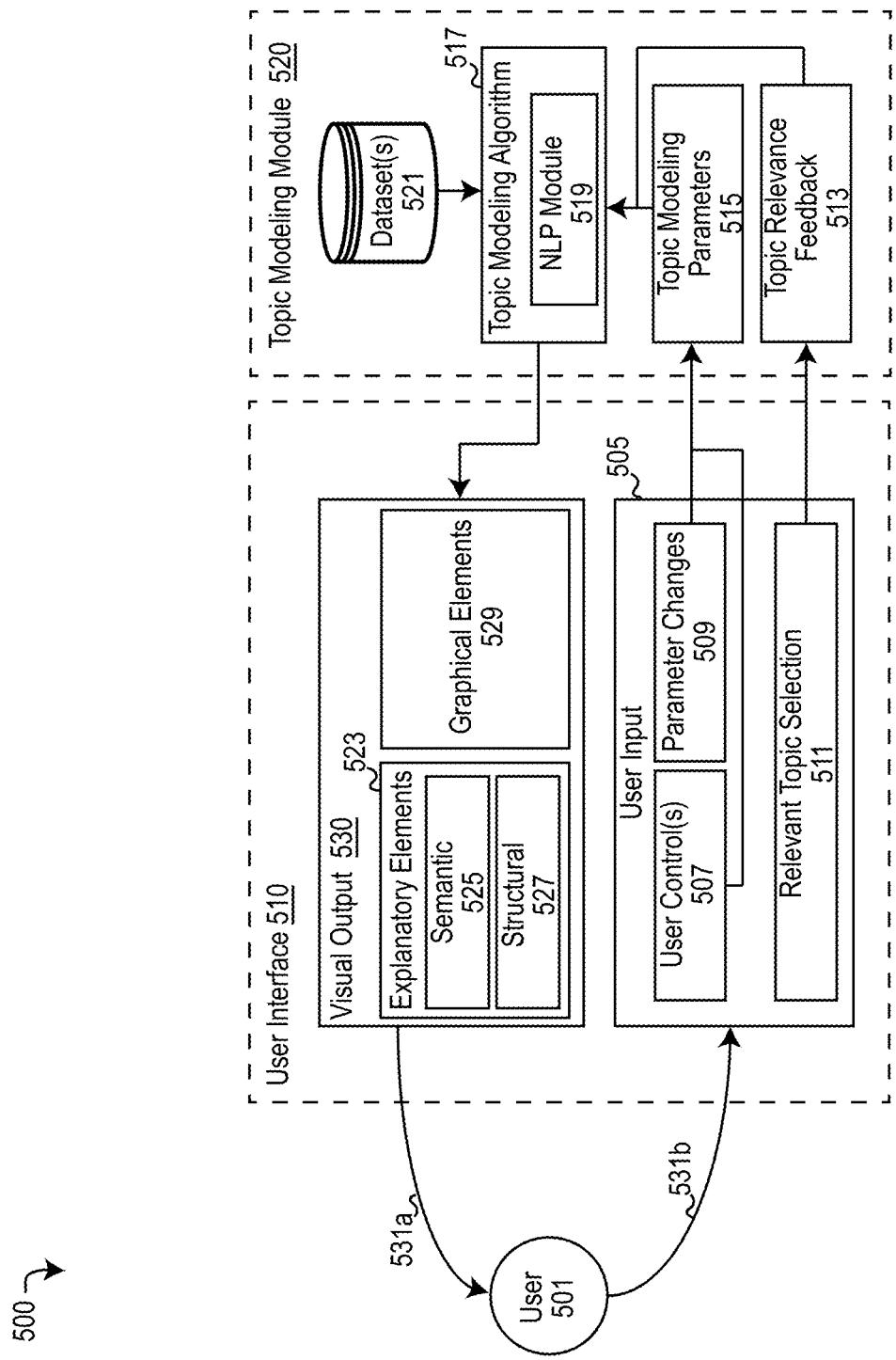
FIG. 5 depicts a functional block diagram describing an embodiment of a computing environment for controlling and visualizing topic modeling results, adding transparency and controllability to a topic modeling algorithm, in accordance with the present disclosure.

Referring to the drawings, FIG. 5 depicts an embodiment of a computing environment 500 illustrating a topic modeling system capable of visualizing topic modeling results and provides transparency to the topic modeling results; allowing the user 501 interactively control the topic modeling via an iterative process incorporating user input 505 to refine the topic modeling. As illustrated, the computing environment 500 may be comprised of (among other components) a topic modeling module 520 and an interactive user interface 510. The user interface 510 visually displays topic modeling results generated by the topic modeling module 520 as visual output 530. The topic modeling results can be manipulated, explored and iteratively changed in response to the receipt of user input 505 received from user 501. The term "module" may refer to a hardware module, software module, or a module may be a combination of hardware and software resources. A module (whether hardware, software or a combination thereof) may be designed to implement or execute one or more specific tasks, routines or functions. Embodiments of hardware-based modules may include self-contained components such as chipsets, specialized circuitry, one or more memory 105 devices and/or persistent storage 106. A software-based module may be part of a program 114, program code or linked to program code comprising a set of specific programmed instructions loaded into a memory 105 device or persistent storage 106 device. As shown in FIG. 5, embodiments of the topic modeling module 520 may include one or more subcomponents that may perform the tasks, processes or functions associated with creating, updating and/or outputting topic modeling results, along with semantic 525 and/or structural 527 explanatory elements 523 thereof to a user interface 510. Embodiments of the topic modeling module 520 may comprise one or more topic modeling algorithms 517, and an NLP module 519. In some embodiments, the topic modeling module 520 may further include, or may be placed in communication with one or more dataset(s) 521.

Embodiments of the topic modeling system depicted by computing environment 500 may be referred to as a model-driven visualization approach to topic modeling. The modeling system may enhance interpretability and user trust in the automatic textual analysis techniques employed by the topic modeling algorithm 517 and/or NLP techniques by deploying an iterative feedback cycle 531a, 531b (referred to generally herein as "iterative feedback cycle 531") that allows the user 501 to steer the topic modeling process via user input 505. The visual analytics provided to the user 501, via the user interface 510, may combine the automated analysis of the model parameters, topic matching, semantic summarization and structural summarization of differences between the topics with visual output 530. The visual output 530 may take the form of an interactive dashboard comprising both graphical elements 529 and the explanatory elements 523 (i.e., semantic 525 and structural 527). A user 501 viewing the visual output 530 can compare, evaluate and intuitively control the topic modeling provided by the topic modeling module 520 without having to read all of the documents that make up dataset(s) 521 or understand the mathematics underlying the topic modeling algorithm(s) 517.

Embodiments of the topic modeling module 520 may conduct topic modeling of a document collection inputted from one or more sources of data, (i.e., dataset(s) 521). Topic modeling may be a type of statistical modeling that implements one or more algorithms onto the dataset(s) 521 for discovering topics and/or patterns within a collection of documents that form the dataset(s) 521. The topic modeling module 520 may analyze the themes within a corpus of texts that make up dataset(s) 521 and output a visual framework for users to understand how the topics are identified by the topic modeling algorithm(s) 517. Through a user-driven, iterative process, topic modeling module 520 adapts the topic modeling algorithm 517 to the needs of the user 501 using an interactive visual user interface 510 that may not require a deep understanding of the underlying topic modeling algorithm(s) 517 being used to analyze the dataset(s) 521, allowing the user to provide topic relevance feedback 513 and experiment with topic modeling parameters 515 to alter the topic distribution in a manner acceptable to the user 501.

Embodiments of the topic modeling algorithm 517 may be a class of unsupervised machine learning algorithms that categorize the collection of documents that make up the dataset(s) 521 into a distribution of topics discovered within the dataset(s) 521 without the need to read the documents that comprise the dataset(s) 521 and/or engage in time-consuming training to create a machine learning model that performs topic classification to analyze texts of the document collection within a dataset 521. Embodiments of topic modeling algorithms 517 may use NLP techniques to count words, group similar word patterns in order to infer topics within the unstructured data of dataset 521 and detect patterns such as word frequency and/or distances between words. Topic modeling algorithm 517 may cluster together words and expressions that appear most often and/or most often together within the documents of the dataset 521 in order to quickly deduce what each set of texts within the collection of documents are talking about (i.e., the topic). For example, embodiments of the topic modeling algorithm 517 of the topic modeling module 520 may utilize a probabilistic approach to topic modeling, such as a Latent Dirichlet allocation (LDA) approach or a non-probabilistic approach, such as Non-negative Matrix Factorization (NMF) technique.

In an exemplary embodiment, the topic modeling algorithm 517 may implement hierarchical topic clustering to perform topic modeling of the dataset 521. Hierarchical clustering may refer to an algorithm that groups similar objects into clusters. The endpoint that is outputted by a model using a hierarchical clustering algorithm is a set of clusters wherein in each cluster is distinct from one another and the objects within each cluster are broadly similar to one another. In the case of hierarchical topic clustering, each of the clusters represent a distinct and separate topic extracted from the dataset 521. Hierarchical clustering may be performed using either a distance matrix or raw data. In situations where raw data is provided by the dataset 521, the topic modeling module 520 may compute the distance matrix using the objects of the dataset(s) 521 provided for topic modeling.

A hierarchical clustering algorithm may initiate by treating each observation within the dataset 521 as a separate cluster. Hierarchical techniques may be agglomerative or divisive. When using agglomerative clustering, the algorithm may repeatedly identify two clusters that are closest together (i.e., the most similar) and merge those two most similar clusters until the threshold number of clusters are reached (or all clusters are merged together). In contrast, divisive hierarchical clustering takes an opposite approach. Where agglomerative merges clusters together, divisive hierarchical clustering starts with all datapoints as part of a single cluster, and with each iteration separates or splits the data points from the cluster that are not similar (or certain conditions are met, such as a threshold) and may continue splitting the clusters until a particular number of clusters are formed and/or conditions are met that would not justify further splitting the clusters. Leaving in the end, "n" number of clusters. The main output of a hierarchical clustering algorithm (either agglomerative or divisive) may be a dendrogram which can visually depict the hierarchical relationship between the clusters as a tree-like diagram that records a sequence of merges or splits between the identified clusters. The distance between two clusters (i.e., two topics) represents the similarity between the identified topics, wherein the closer in distance between the two topics, the shorter the Euclidean distance, and the further the Euclidean distance between clusters, the more different two topics are from one another. Euclidean distance may be calculated based on the length of a straight line drawn from one cluster to another.

Measuring the Euclidean distance between clusters may be performed using a plurality of different approaches. Examples of the approaches may include MIN, MAX, group average, distance between centroids and Ward's method. The MIN approach (also known as the single-linkage algorithm) may be define the similarity of two clusters as equal to the minimum of the similarity between a point ($P_i$) of the first cluster ($C_1$) and a point ($P_j$) of the second cluster ($C_2$). In other words, the distance between two closest points wherein the first point lies within a first cluster and the second point lies in the second cluster. Mathematically, the similarity between the two clusters using the MIN approach may be written as $Sim(C_1,C_2)=Min\ Sim(P_i,P_j)$ such that $P_i \in C_1\ \&\ P_j \in C_2$. The MIN approach may be useful for separating non-elliptical cluster shapes in situations wherein the gap between the two clusters is not small. The MIN approach may experience difficulty separating clusters if there is noise (i.e., data points) between the clusters.

The MAX approach (known as the complete linkage algorithm) is the opposite of the MIN approach. The similarity between the two clusters ($C_1$ and $C_2$) is equal to the maximum of the similarity between a point ($P_i$) of the first cluster ($C_1$) and a point (Pj) of the second cluster ($C_2$), wherein the points of the first cluster and the second cluster are the points that are furthest apart. Written mathematically, the MAX approach for calculating similarity between clusters may be written as $Sim(C_1,C_2)=Max\ Sim(P_i,P_j)$ such that $P_i \in C_1$ & $P_j \in C_2$. The MAX approach may perform well for separating clusters where there is noise between the clusters. However, the MAX approach may suffer drawbacks because MAX may be biased toward globular shaped clusters and may break large clusters.

The group average approach may take pairs of points within the clusters being measured, compute the similarities by distance and calculate the average of the similarities. The group average approach may be mathematically written as $sim(C_1,C_2)=\Sigma sim(P_i, P_j)/|C_1|*|C_2|$, where $P_i \in C_1$ & $P_j \in C_2$. Similar to the MAX approach, the group average does well separating clusters even when there is noise between the clusters, while being biased toward globular clusters. The Ward's method approach is exactly the same as the group average approach, except that Ward's method calculates the sum of the square of the distance between the first point ($P_i$) and the second point ($P_j$). Mathematically, Ward's method can be written as $sim(C_1,C_2)=\Sigma(dist(P_i, P_j))^2/|C_1|*|C_2|$. Lastly, the centroid approach computes the similarity between two clusters by measuring the Euclidean distance between the two centroids of the two clusters.

Figure 6:
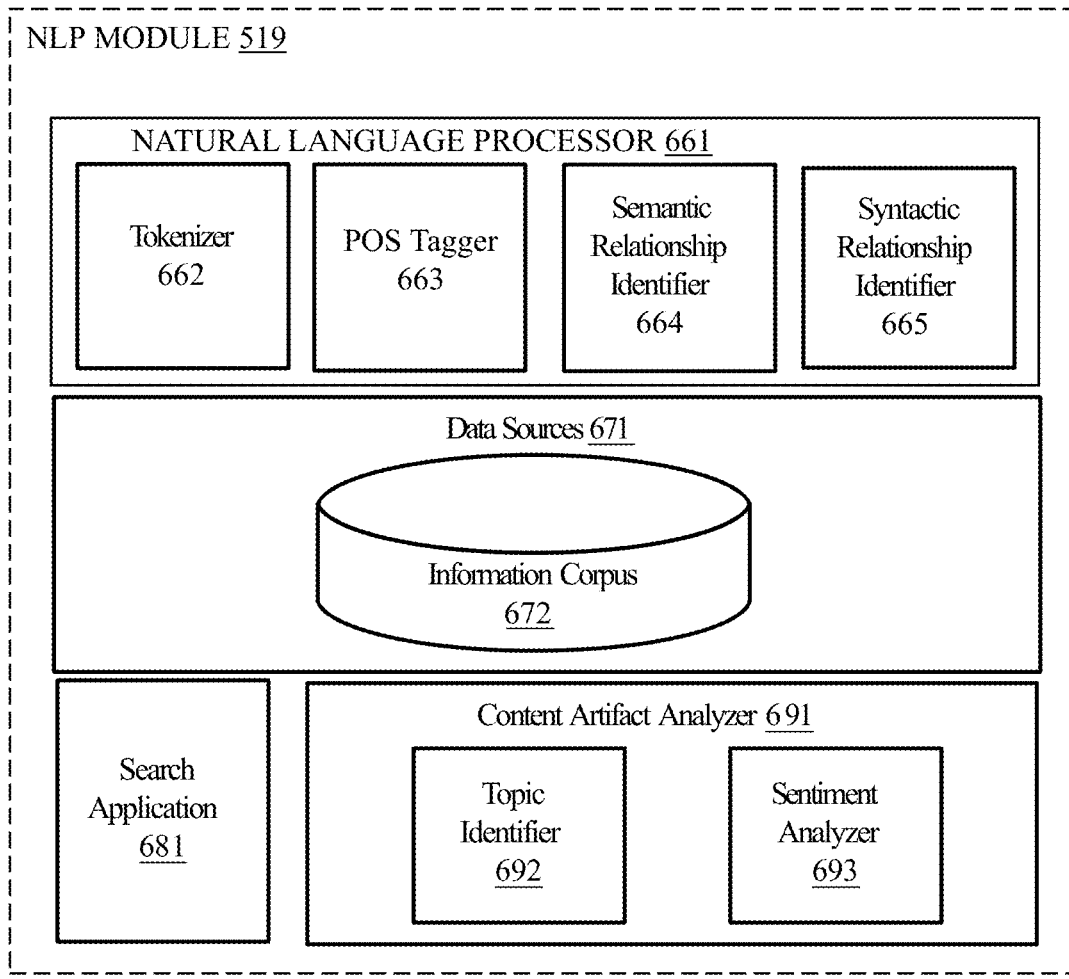
FIG. 6 depicts a block diagram describing an embodiment of a natural language processing module in accordance with the present disclosure.

Embodiments of the topic modeling algorithm 517 may process the dataset 521 comprising the document collection using one or more natural language processing techniques. In some embodiments, the topic modeling module 520 may include an NLP module 519 responsible for performing natural language processing functions on the datasets 521 being modeled by the topic modeling algorithm 517. FIG. 6 provides a more detailed example of an NLP module 519 that may be utilized as part of the topic modeling module 520 to perform natural language processing on the dataset(s) 521 being modeled by the topic modeling algorithm 517. In some embodiments, the NLP module 519 may include a natural language processor 661, data sources 671, a search application 681, and/or a content artifact analyzer 691. The natural language processor 661 may include a computer module that analyzes the content of the dataset(s) 521 being inputted into the topic modeling algorithm 517. The natural language processor 661 may perform various methods and techniques for analyzing the ingested data of the datasets 521, including metadata (e.g., syntactic analysis, semantic analysis, etc.). The natural language processor 661 may be configured to recognize and analyze any number of natural languages. Further, the natural language processor 661 may include various modules to analyze and parse the unstructured data of the dataset(s) 521 for topic modeling. These modules may include, but are not limited to a tokenizer 662, a part-of-speech (POS) tagger 663, a semantic relationship identifier 664, and a syntactic relationship identifier 665.

Embodiments of tokenizer 562 may be a computer module that performs lexical analysis. The tokenizer 562 may convert a sequence of characters into a sequence of tokens. A token may be a string of characters displayed as text or as visual elements of an UI. Further, in some embodiments, the tokenizer 662 may identify word boundaries of the textual elements being displayed by a UI and break text passages within the displayed textual elements into component of the textual elements, such as words, multiword tokens, numbers, and punctuation marks. In some embodiments, the tokenizer 662 may receive a string of characters, identify the lexemes in the string, and categorize them into tokens.

Part of Speech (POS) tagger 663 may be a computer module that marks up a word in passages to correspond to a particular part of speech. The POS tagger 663 may read a passage or other text in natural language and assign a part of speech to each word or other token. The POS tagger 563 may determine the part of speech to which a word (or other text element) corresponds, based on the definition of the word and the context of the word. The context of a word may be based on its relationship with adjacent and related words in a phrase, sentence, or paragraph. In some embodiments, the context of a word may be dependent on one or more previously analyzed textual elements. In some embodiments, the output of the natural language processor 661 may populate a text index, a triplestore, or a relational database to enhance the contextual interpretation of a word or term. Examples of parts of speech that may be assigned to words include, but are not limited to, nouns, verbs, adjectives, adverbs, and the like. Examples of other part of speech categories that POS tagger 663 may assign include, but are not limited to, comparative or superlative adverbs, wh-adverbs, conjunctions, determiners, negative particles, possessive markers, prepositions, wh-pronouns, and the like. In some embodiments, the POS tagger 663 may tag or otherwise annotate tokens of a passage with part of speech categories. In some embodiments, the POS tagger 663 may tag tokens or words of a passage to be parsed by the natural language processor 661.

In some embodiments, the semantic relationship identifier 664 may be a computer module that may be configured to identify semantic relationships of recognized text elements (e.g., words, phrases) within the collection of documents of dataset(s) 521. In some embodiments, the semantic relationship identifier 664 may determine functional dependencies between entities and other semantic relationships. Moreover, a syntactic relationship identifier 665 may be a computer module that may be configured to identify syntactic relationships in a passage composed of tokens. The syntactic relationship identifier 665 may determine the grammatical structure of sentences within the documents of dataset(s) 521. For example, syntactic relationship identifier 665 may identify which groups of words are associated as phrases and which word is the subject or object of a verb. The syntactic relationship identifier 665 may conform to formal grammar rules.

In some embodiments, the output of natural language processor 661 may be used by search application 681 to perform a search of a set of (e.g., one or more) corpora to retrieve information regarding content artifacts. As used herein, a corpus may refer to one or more data sources 671. In some embodiments, the data sources 671 may include data warehouses, information corpora, data models, and document repositories. In some embodiments, the data sources 671 may include an information corpus 672. The information corpus 672 may enable data storage and retrieval. In some embodiments, the information corpus 672 may be a storage mechanism that houses a standardized, consistent, clean, and integrated list of topics. The information corpus 672 may also store, for each topic, a list of associated outcomes. For example, the information corpus 672 may include a ranking of topics for each user, and/or a profile for each user 501 of the topic modeling module 520. The data may be sourced from various operational systems. Data stored in the information corpus 672 may be structured in a way to specifically address reporting and analytic requirements. In some embodiments, the information corpus 672 may be a data repository, a relational database, triplestore, or text index.

In some embodiments, the content artifact analyzer 691 may be a module that identifies conversational topics and user sentiments associated with one or more topics. In some embodiments, the content artifact analyzer 691 may include a topic identifier 692 and a sentiment analyzer 693. When textual elements from the dataset(s) 521 are inputted into the NLP module 519, the content artifact analyzer 691 may be configured to analyze textual elements inputted using natural language processing to identify one or more content topics, including one or more intents and entities associated with the input. The content artifact analyzer 691 may first parse the textual elements using the natural language processor 561 and related subcomponents 662-665. After parsing the textual elements of the dataset(s) 521, the topic identifier 692 may identify one or more topics present in the content that was parsed. This may be done, for example, by searching a dictionary (e.g., information corpus 672) using the search application 681. The sentiment analyzer 693 may determine the content sentiment for the ingested data and metadata of the dataset(s) 521, according to the content topic identified by topic identifier 692. This may be done by using the search application 681 to traverse the various data sources (e.g., the information corpus 672) for information regarding the terms and phrases used within the collection of documents that comprise dataset 521. The sentiment analyzer 693 may search, documents from the various data sources 671 for terms related to those detected as part of the ingested data and/or metadata of the dataset(s) 521.

During the initial modeling of a dataset 521 by the topic modeling module 520, initial parameters may be used for the first round of topic modeling by the topic modeling algorithm 517. Topic modeling parameters 515 may refer to configurations or settings that specify one or more model characteristics. For example, a threshold number of topics, weightings afforded to specific words or classes of words within the documents of the dataset 521, keyword vectors which may be ranked lists of words which represent extracted topics, documents descriptors which may be vectors of scores relating each document to each topic and methods for measuring similarities between the identified clusters representing the identified topics of the documents. Topic models may operate within in a vector space defined by accumulated keyword frequency vectors of all documents within the dataset 521 being analyzed. Document descriptor vectors may be constructed using a bag-of-words model, which may weigh every keyword in the vector by its overall frequency within the documents of the dataset 521. The weights can be adjusted by the topic modeling parameters 515, which may be initialized in a pre-processing step in some embodiments.

The initial parameters may be a default set of parameters used by the topic modeling algorithm 517, topic modeling parameters 515 initially set by the user 501 and/or an automated data-driven parameter selection of parameters which may be further adjusted by the user. In order to achieve a strong initial set of topic modeling results, initial parameters of the topic modeling algorithm 517 may be established in a manner that strongly associates the groupings of the documents within the dataset 521 with a single topic and topics generated by the model to have minimal overlap. To achieve good resolution between identified topics, the initial topic modeling parameters 515 may provide weights to classes of words (i.e., features), which may be referred to as feature weights. For example, weights may be assigned to different parts of speech that are considered more important and thus the system would like to emphasize, such as boosting the importance of proper nouns, while reducing the weight of function words such as "stop word".

Embodiments of the topic modeling module 520 may construct a visual workspace, such as an interactive dashboard to display and/or describe the topic modeling results of the topic modeling algorithm 517, while allowing the user 501 to dynamically manipulate and explore the processed data and topic modeling output of the topic modeling algorithm 517. The visual workspace may be described as visual output 530 and may be presented to user 501 as part of user interface 510. The visual output 530 may include both graphical elements 529 and explanatory elements 523. Graphical elements 529 may refer to visual components of the user interface 510 that may present or communicate information to the user 501, may be manipulated by the user 501 in a manner to dynamically change or alter the elements 523, 529 being presented to the user 501 and/or allow the user 501 to input information into the user interface 510 in order to interact with the topic modeling module 520. Explanatory elements 523 may refer to information presented to the user as part of the visual output 530 from the topic modeling module 520 that provides explanation(s) about the topic modeling results. In some embodiments, the explanatory elements 523 may be part of, or integrated with, the graphical elements 529 of the user interface 510 being presented to the user 501. Embodiments of the explanatory elements 523 may include semantic 525 summaries of the topic modeling results and/or structural 527 attributes. Semantic 525 summaries of the topic modeling results outputted from the topic modeling module 520 may explain topic definitions using one or more NLP techniques. For example, semantic 525 summaries of the modeling results may include (but are not limited to) part-of-speech annotated keywords, ngrams, relevant sentences, etc. Structural 527 attributes on the other hand may explain the differences between topics, for example using one or more metrics such as cohesiveness. In some embodiments, structural 527 attributes may also explain to the user 501 the hierarchical organization of the topics and relationships between the topics identified by the topic modeling algorithm 517.

Figure 7:
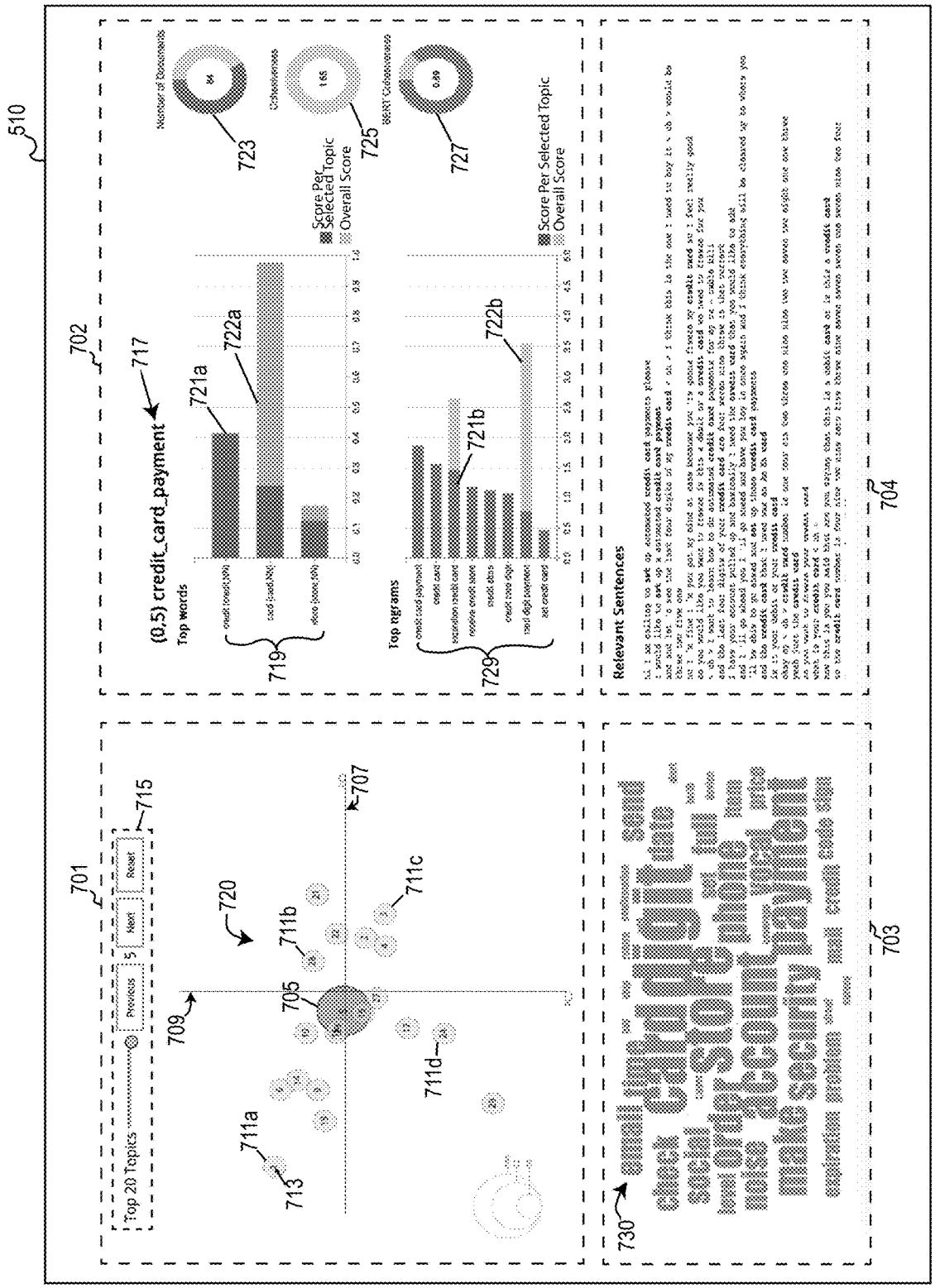
FIG. 7 illustrates an exemplary embodiment of a user-controlled topic modeling interface for visualizing, exploring and controlling topic modeling results, in accordance with the present disclosure.

FIG. 7 provides an exemplary embodiment of visual output 530 that may be displayed by user interface 510. As shown, the user interface 510 may be depicted as a visual workspace or dashboard for a user 501 to interactively explore topic modeling results, compare and contrast results from various iterations of the topic modeling performed by the topic modeling algorithm 517 in order to make parameters changes 508 and/or adjustments to user controls 507, refining or experimenting with future topic modeling results of subsequent iterations. As shown, the visual workspace being outputted by the topic modeling module 520 can include a plurality of sections 701, 702, 703, 704. While four separate sections 701-704 are displayed in the exemplary embodiment of FIG. 7, any number of visual areas depicting explanatory elements 523 and/or graphical elements 529 describing the topic modeling results may be displayed as visual output 530 on the user interface 510.

Embodiments of each section 701-704 may display dynamic content that may visually change or adjust the graphical elements 529 and/or explanatory elements 523 as the user engages, explores and interacts with the dynamic content (i.e., graphical elements 529 and/or explanatory elements) being presented within one or more of the displayed sections 701-704. As exemplified by the depiction of the user interface 510 in FIG. 7, a first section 701 of the visual output 530 may include a two-dimensional (2D) spatial distribution 720 of topics comprising a plurality of nodes 711 (e.g., 711a-711d) plotted on a set of axes 707, 709. Each node 711 of the 2D spatial distribution may represent a topic of the documents within dataset 521 identified by the topic modeling algorithm 517. The distance between each of the nodes 711 may represent the similarity between the topics represented by the nodes 711 in two-dimensional space obtained through multidimensional scaling of semantic embeddings, including document feature vectors or Bidirectional Encoder Representations from Transformers (BERT) embeddings in sentences of the dataset 521. For example, node 711b and node 711c are closer in distance to one another than node 711a and node 711c, therefore, the topic of nodes 711b and 711c are more closely related to one another than the topics of nodes 711a and 711c.

Figure 8A:
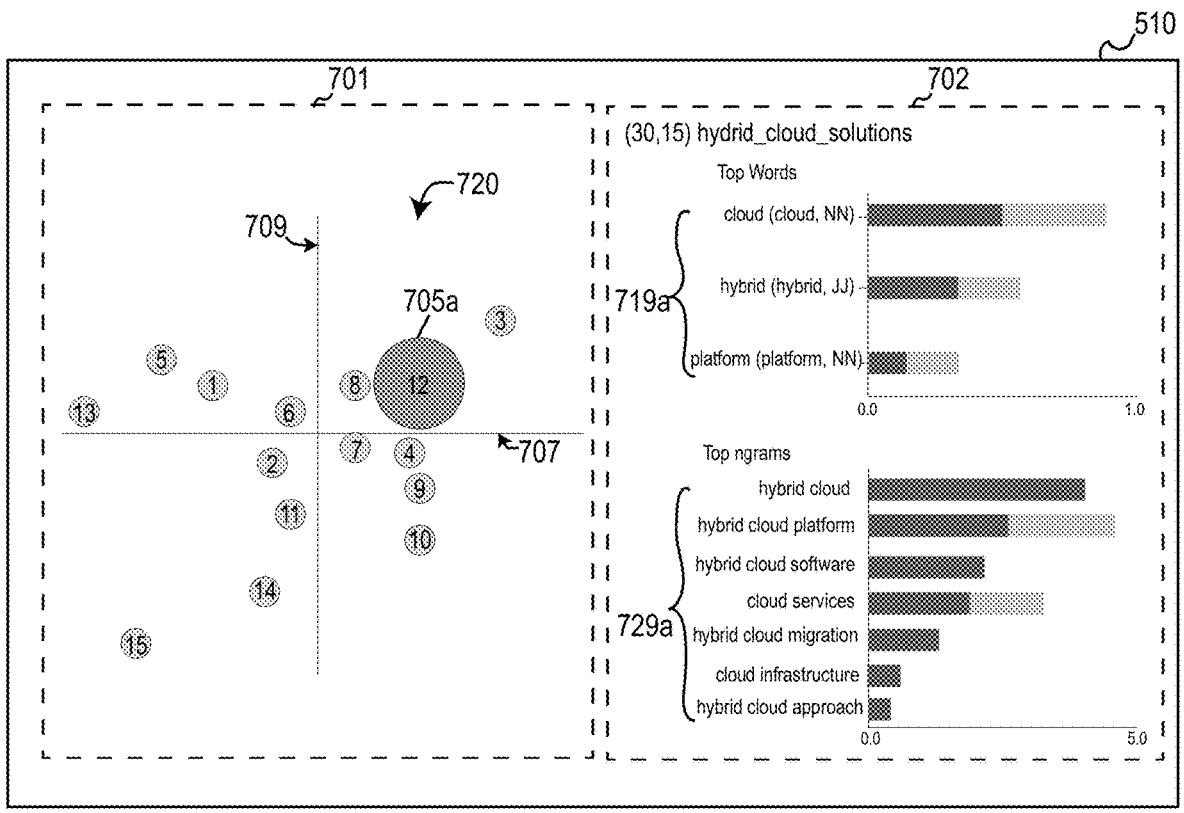
FIG. 8A illustrates an embodiment of a portion of a user-controlled topic modeling interface, comprising a 2-D visualization-based interface in a first selected configuration displaying user-directed topic modeling results.

The dynamic changes displayed by the user interface 510 may be in response to changes or manipulation by a user 501 to one or more elements 523,529 within a section 701, 702, 703, 704 of the user interface 510. In response, said changes to the one or more elements 523, 529 displayed may be reflected within the same section 701, 702, 703, 704 where the manipulation occurs. For example, a user 501 may manipulate the number of topics displayed by the 2D spatial distribution 720 by adjusting the distribution controls 715, allowing the user to toggle the number of nodes 711 currently being displayed and/or cycle through the nodes 711 in order based on a ranking 713 displayed for each node 711. In another example, a user 501 may manipulate the 2D spatial distribution 720 of topics within a first section 701 by hovering over a node or selecting one or more nodes 711. Hovering over a node 711 such as selected node 705, may result in a change to the color, shape and/or size of the node. In the exemplary embodiment, hovering over a node 711 displayed by the user interface 510 may expand the size of the selected node 705 to a value proportional to the number of documents within the topic of the selected node 705. An example of the difference between selected nodes 705a and 705b on a spatial distribution 720 of topics can be seen in FIGS. 8A-8B. As shown in FIG. 8A, hovering or selecting the $12^{th}$ node 705a results in a larger node size than hovering over the $15^{th}$ node 705b, indicating that the $12^{th}$ node 705b displayed by the spatial distribution 720 of topics incorporates a larger number of the total documents from the dataset 521 than the $15^{th}$ node 705b.

In some instances, user manipulation of the elements 523, 529 displayed by the user interface 510 may be reflected in a separate section 701-704 from where the manipulation occurs. For example, a change within first section 701 may also be reflected in section 702, section 703 and/or section 704 of the user interface 510. For instance, in response to the selection of a selected node 705, a change to the 2D spatial distribution 720 may be reflected directly within the first section 701 by adjusting the size of the selected node 705 to expand the selected node's size to a value proportional to a number of documents within the topic encompassed by the selected node 705. Moreover, in response to the selection of the selected node 705, the second section 702 may be populated with an individual topic view corresponding to the selected node 705; providing both semantic 525 and structural 527 explanations of the topic of the selected node 705.

Figure 8B:
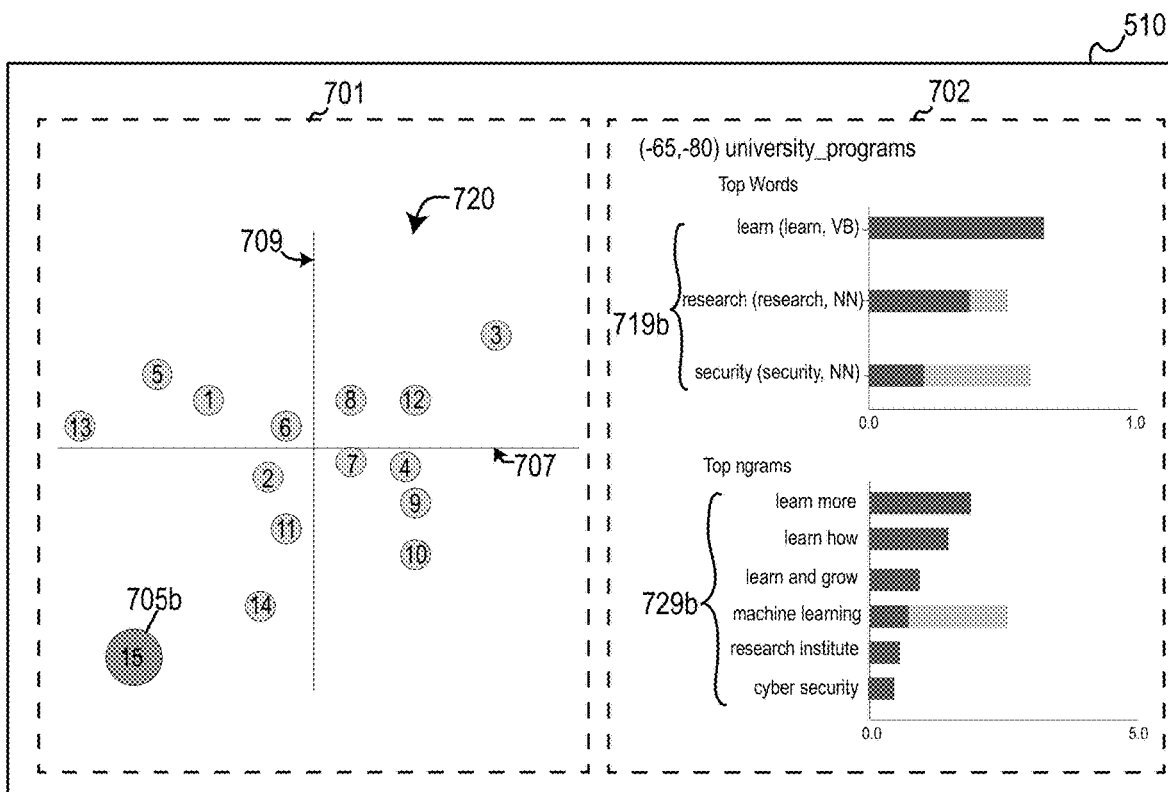
FIG. 8B illustrates the embodiment of the portion of the 2-D visualization-based interface of FIG. 8A in a second selected configuration displaying a different portion of the topic modeling results, as directed by the user.

In some embodiments, exploring and manipulating visual output 530 within a first section 701 of the user interface 510 may produce a visual change to the visual output 530 within multiple sections 701-704 simultaneously. For example, a user 501 exploring and manipulating the 2D spatial distribution 720 of topics within the first section 701 by selecting a node, may simultaneously produce changes to the visual output 530 in section 701 by depicting a change to the selected node 705 by the change in size, color, shape, etc. on the user interface 510, as well as displaying an individual topic view within section 702 and generate portions of relevant sentences for the selected top in section 704 which may display entire sections of topic-relevant sentences extracted from documents using NLP and displayed to the user 501. FIGS. 8A-8B provide an example user interface 510 demonstrating an example of the dynamic changes to the user interface 510 that may be displayed as a result of user 501 exploration. For example, in FIG. 8A, the $12^{th}$ ranked node 705a is selected from the 2D spatial distribution 720 of topics, as indicated by the change in color and/or size of the $12^{th}$ node 705a compared with the remaining, unselected nodes. As shown, in response to the selection of $12^{th}$ node 705a in the first section 701, an individual topic view corresponding to the $12^{th}$ node 705a is dynamically added to the second section 702 entitled "hybrid_cloud_solutions" comprising a first set of top words 719a and a first set of top ngrams 729a. In contrast, in FIG. 8B, the $15^{th}$ node 705b is selected by the user as indicated by the change in size, and color of the $15^{th}$ node 705b in FIG. 8A compared with FIG. 8B. Selection of the $15^{th}$ node 705b from the 2D spatial distribution 720 generates a different individual topic view than the selection of the $12^{th}$ node 705a; providing a different set of details for the user to explore. As shown in FIG. 8B, the individual topic view displayed within the second section 702 for the selected $15^{th}$ node 705b is entitled "university_programs" and includes a different set of top words 719b and top ngrams 729b.

Embodiments of the second section 702 of the user interface 510 may be described as a detailed individual topic view of a selected node 705. Details of the individual topic view that may be presented to the user 501 may include a topic description 717, which may include coordinates of the selected node 705 on the 2D spatial distribution 720 of topics; a set of top words 719 found within the topic of the selected node 705 and/or a set of top ngrams 729 within the topic of the selected node 705. Embodiments of the individual topic view presented in section 702 may further include metrics indicating the importance of each top word 719 or ngram 729 within the topic itself and the document collection of the dataset 521 as a whole. As shown in FIG. 7 by the bar graphs of the exemplary embodiment, a score per selected topic 721a, 721b is depicted indicating the relative importance of the top words 719 or top ngrams 729 amongst the other words or ngrams within the selected node 705 and an overall score 722a, 722b indicating the overall importance of each top word 719 or top ngram 729 across the entire dataset 521. Additional metrics 723, 725, 727 displayed by the user interface 510 within the individual topic view of the selected node 705 may indicate the importance of the selected topic within the collection of documents that makeup the dataset 521. The additional metrics presented to the user 501 within section 702 of the user interface 510 may include a documents score 723 indicating the number of documents that makeup the topic of the selected node 705, a cohesiveness score 725 indicating a measure of cohesiveness using document feature vectors to evaluate a degree of semantic similarity between top scoring words within the topic, and/or a BERT cohesiveness score 727 measuring coherence within a topic using BERT embeddings of sentences.

In some embodiments of the user interface 510, one or more elements 523, 529 of the individual topic view detailed within section 702 may be user-interactive and dynamically explorable by user 501. For example, a user 501 may select any of the top words 719 or top ngrams 729 within the second section 702, and in response to the selection made by the user 501, a visualization change may occur within first section 701. In particular, based on the selected top word 719 and/or top ngram 729, the appearance of the 2D spatial distribution 720 of topics may change dynamically to reflect only nodes 711 for topics related to the top word 719 or top ngram 729 that the user 501 selected. For example, using the individual topic view shown in FIG. 7, a user 501 selecting the top word 719 "credit" would result in the 2D spatial distribution 720 to include only nodes 711 related to the top word 719 "credit", removing any nodes unrelated to "credit" from being visualized by the 2D spatial distribution 720.

In some embodiments the topic modeling module 520 may generate and output to the user interface 510, as part of each iteration of the topic modeling results, a word cloud 730 summarizing the topmost commonly used words within the collection of documents that comprise dataset 521. In the exemplary embodiment of FIG. 7, the word cloud 730 is positioned within the third section 703 of the user interface 510. The size of each word within the word cloud 730 may be proportional to the number of occurrences a word appears within the collection of documents, providing an overarching visual view of the entire document collection, whereby the largest words in the word cloud 730 are the words occurring most often and the smallest words are frequently occurring words that may occur less often within the dataset 521. Moreover, in some embodiments of the user interface 510, individual words of the word cloud may be selectable by user 501 and selection thereof may dynamically alter other sections of the user interface 510 being explored by the user 501. In the exemplary embodiments of the topic modeling system, a user's selection of one or more words from the word cloud 730 may trigger a change in the visualization of the 2D spatial distribution 720 of topics, displaying only nodes 711 for topics related to the term of the word cloud 730 selected by the user 501.

Figure 9A:
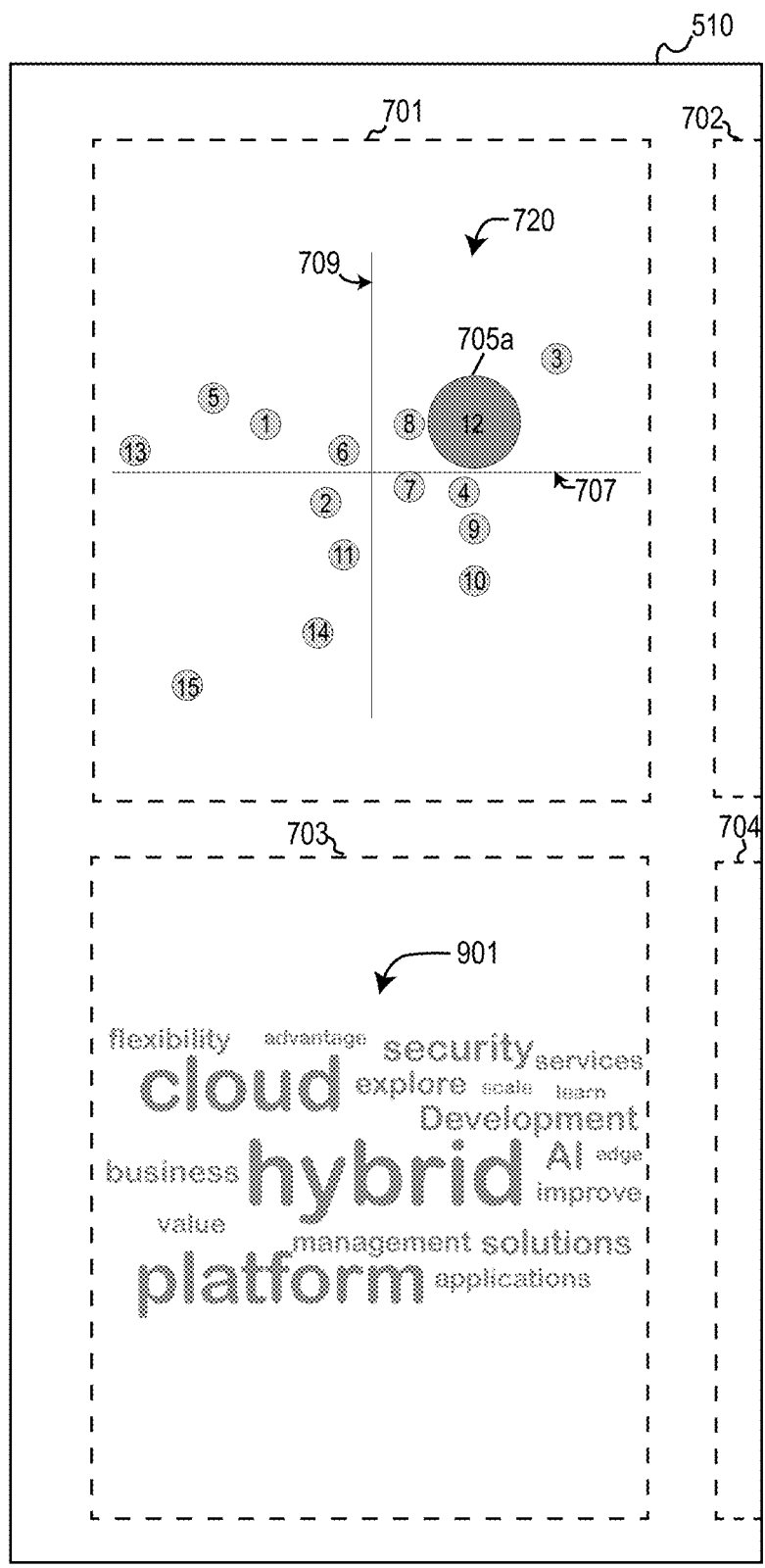
FIG. 9A illustrates an embodiment of a portion of a user-controlled topic modeling interface displaying a broad range of topic modeling results as a 2D spatial distribution of topics and a word cloud describing top terms appearing within the collection of documents used to form the topics of the topic modeling results.
Figure 9B:
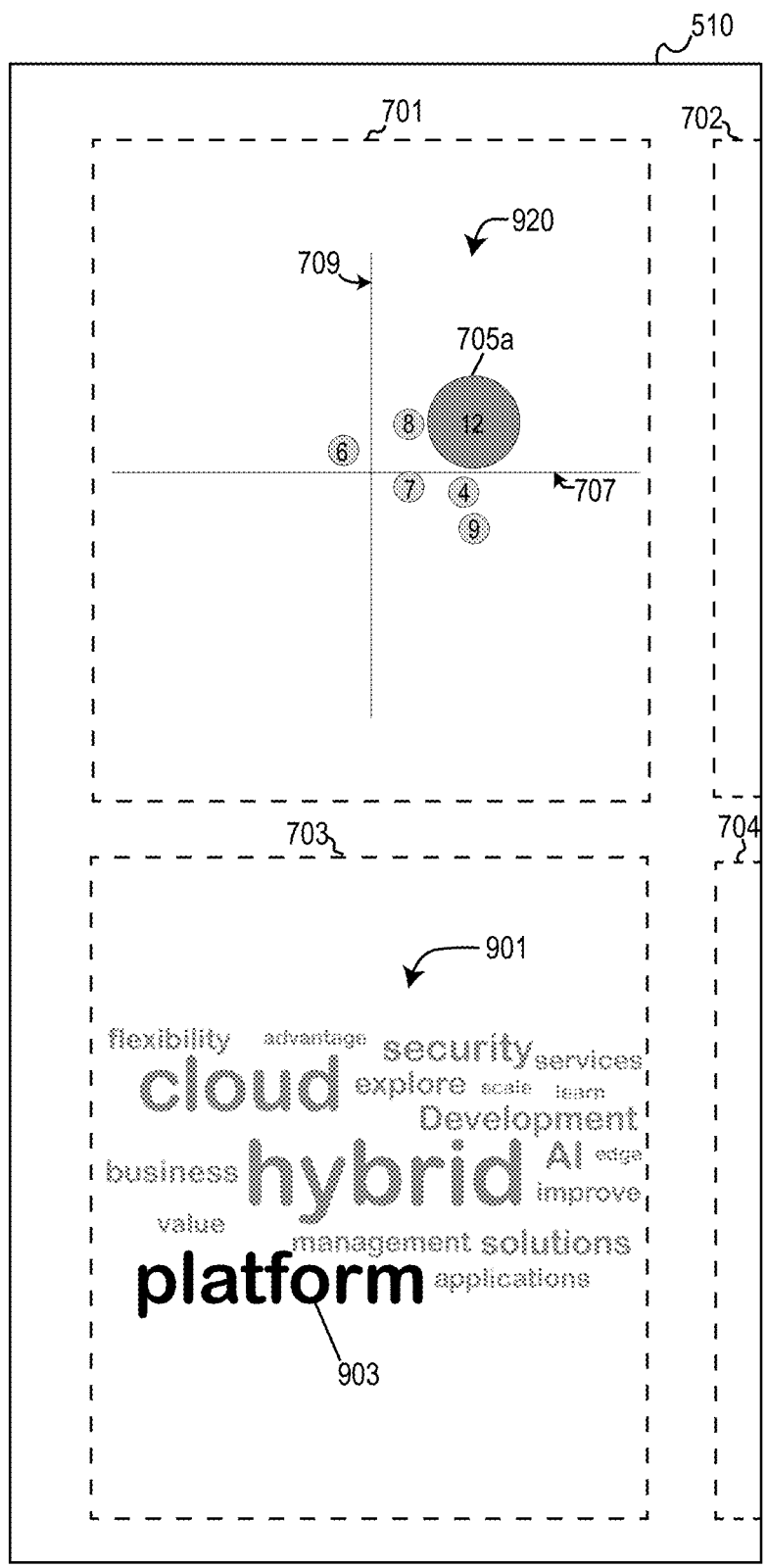
FIG. 9B illustrates the embodiment of the portion of the user-controlled topic modeling interface of FIG. 9A displaying a narrower range of topic modeling results as a function of user-manipulation of the topic modeling interface by selecting one or more terms appearing within the word cloud.

FIGS. 9A-9B depict an exemplary embodiment of a user interface 510 demonstrating the effects of selecting a word from a word cloud 901 and the impact of selecting the word from the word cloud 901 on the displayed content of the 2D spatial distribution 720 of topics. As shown in FIG. 9A, a first section 701 comprises the 2D spatial distribution 720 of topics displaying fifteen nodes, with each node 711 representing a different topic outputted from a topic modeling algorithm 517. The third section 703 of the user interface 510 displays a word cloud 901 comprising a plurality of unselected top words for the dataset 521 used to generate the word cloud 901 of FIG. 9A. In FIG. 9B, a user-selection within the word cloud 901 is displayed, wherein the user-selected word 903 is shown to be the word "platform" in this example. In response to the user-selected word 903, the 2D spatial distribution 720 is dynamically altered into 2D spatial distribution 920 comprising a smaller subset of nodes, which include only topics related to the user-selected word 903 "platform". In contrast to nodes 1 to 15 made available for user interactivity and exploration in the 2D spatial distribution of FIG. 9A, by selecting the user-selected word 903 in the word cloud 901, the choice of user-selectable nodes within 2D spatial distribution 920 becomes limited to only related topics. In this example topics of nodes 4, 6, 7, 8, 9 and 12 are related to the user-selected word 903 and therefore may be further selected and explored by the user 501. For instance, by selecting one of the remaining nodes to view the individual topic view associated therewith, as described above.

Embodiments of user interface 510 as discussed above, provides both an overview of the topics at-a-glance that are distributed within the collection of documents that make up the dataset 521, as well as a detailed understanding of how relevant each topic is within the collection of documents through the use and exploration of the user interface 510. As shown in the computer environment of FIG. 5, a user 501 viewing the visual output 530 of the user interface 510 may impact the next round of changes to the topic modeling results through an iterative feedback cycle 531, which may be an iterative interaction loop between the topic modeling system and the user 501. As part of the iterative feedback cycle, a user 501, through the exploration of the topic modeling results being displayed by the user interface 510, can compare and contrast current topic modeling results with previous results of a past iteration as different topic modeling parameters 515 are inputted and/or the document collection of the dataset(s) 521 change at various points over time. In response to the user comparing and contrasting modeling results and experimenting with parameter changes to the models, user 501 may determine whether another round of topic modeling should be performed by the topic modeling module 520.

As part of the iterative feedback cycle 531, user 501 can control the direction of the next iteration of topic modeling by providing feedback and changes in the form of user input 505 to the topic modeling algorithm 517. User input 505 may include the selection or implementation of one or more user control(s) 507 that may be part of the user interface 510 as the user 501 explores of the topic modeling results, parameter changes 509 (whether specific or experimental) as well as tracking relevant topic selection 511 by the user. User control(s) 507 of user input 505 may refer to features or functions of the user interface 510 that a user 501 may interact with and control to manipulate or adjust the topic modeling results being viewed. For example, cycling through 2D spatial distribution 720 of topics using distribution controls 715, adjusting the granularity of information being displayed by the user interface 510 by broadening or narrowing the scope of topic results being presented. For example, selecting words the word cloud 730, top words 719 and/or top ngrams 729 to adjust the topics displayed by the 2D spatial distribution 720.

Figure 10:
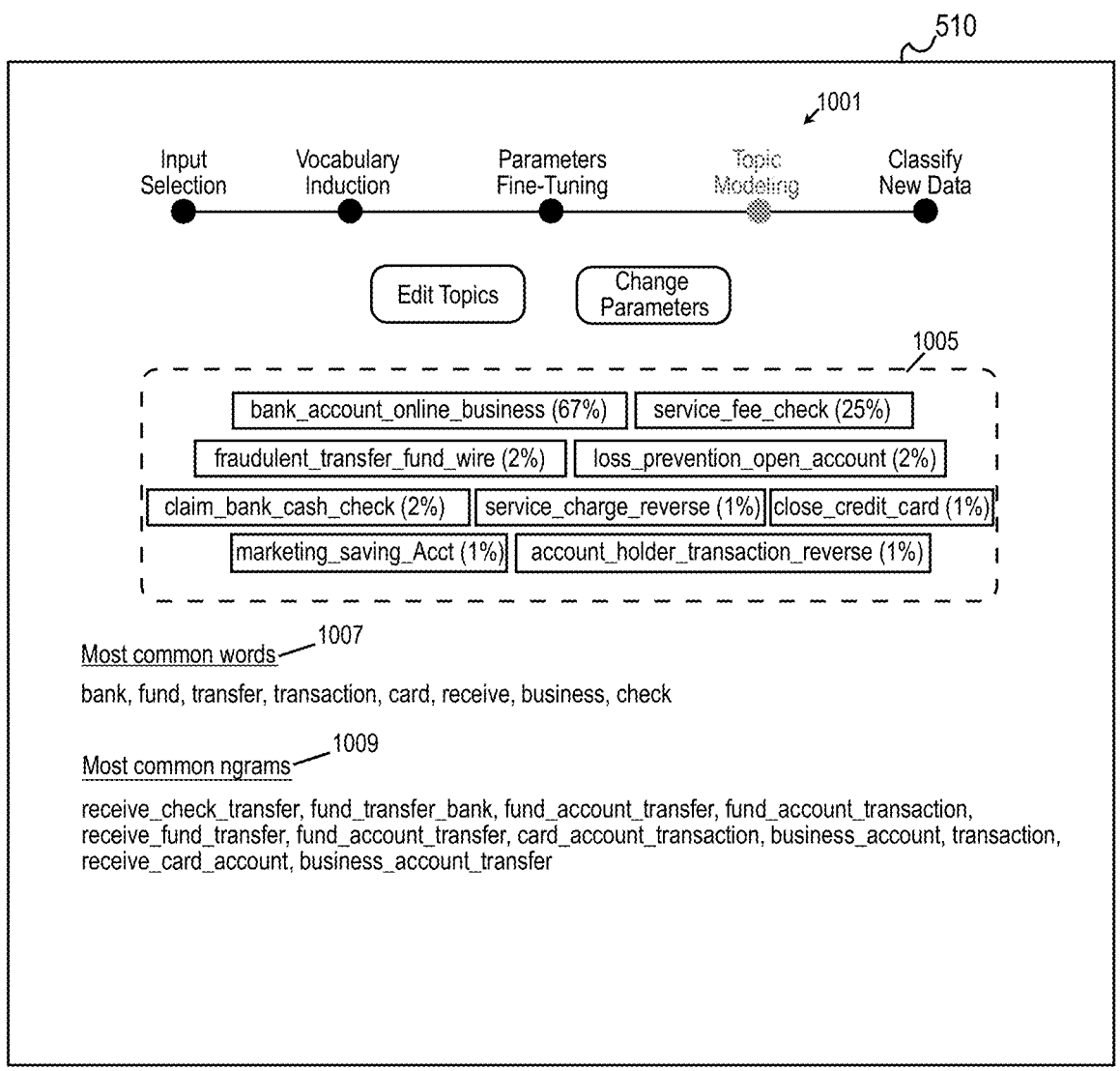
FIG. 10 depicts a portion of a user-controlled topic modeling interface for visualizing, exploring and controlling topic modeling results by editing topics and/or changing parameters for subsequent iterations of topic modeling, in accordance with the present disclosure.

In some embodiments, user control(s) 507 may include directly editing topics being presented as part of the topic modeling results. FIG. 10 provides an exemplary embodiment of a user interface 510 that allows the user 501 to explore editing topics and changing parameters as part of the feedback loop to the topic modeling algorithm 517. As shown in FIG. 10, user input 505 may be applied to one or more aspects of the topic modeling results using a topic modeling interface 1001. As part of the topic modeling interface 1001, inputted user control(s) 507 may directly control aspects of the topic modeling by editing topics directly and/or by manipulating a list of identified topics 1005 displayed by the topic modeling interface 1001. As part of the topic modeling interface 1001, a user 501 may input user control(s) 507 to split or merge the identified topics 1005. For example, by dragging and dropping portions of the identified topics 1005 into one another via the user interface 510, causing the identified topics 1005 to dynamically merge together, and/or separate portions of existing topics 1005 into separate portions which can be reflected on the user interface 510. As a user selects the existing topics 1005 and controls the topics 1005 by merging and/or splitting the topics 1005, the topic modeling interface 1001 may dynamically reflect the most common words 1007 and/or most common ngrams 1009 of a selected topic, in response to the dynamic alterations being inputted into the topic modeling interface 1001 by the user 501.

During the iterative feedback cycle 531 a user 501 may further control the next iteration of the topic modeling results by inputting one or more parameter changes 509 into the user interface 510. Parameter changes 509 inputted into the user interface 510 as user input 505 may update and/or modify topic modeling parameters 515, impacting how the topic modeling algorithm 517 generates the next round of topic modeling results. Examples of topic modeling parameters 515 that may be changed by a user 501 may include a threshold number of topics that the dataset 521 may be divided into, a threshold size for each topic, classes of words (i.e., features), feature weights, keyword vectors, document descriptors, the method for calculating distance between clusters, adding or removing keywords from topics, increasing or reducing weights to single keywords, etc.

In some embodiments of the topic modeling system, user input 505 provided by the user 501 as part of the iterative feedback cycle 531 may include feedback about one or more relevant topics in the form of topic relevance feedback 513. Users 501 interacting with the user interface 510 may be able to indicate how relevant and/or accurate the topic models are during each iteration of topic modeling by providing feedback about the topic modeling as a whole and/or for individual topics the user has selected and navigated through using the user interface 510. Users 501 may provide topic relevance feedback 513 about one or more specific topics outputted by the topic modeling module 520 by making relevant topic selections 511 and rating, scoring, commenting, and/or inputting other types of feedback about the accuracy, breadth, and/or scope of the topics selected; indicating to the topic modeling algorithm 517 whether one or more topics being extracted from the dataset 521 were acceptable to the user 501. Whenever the users 501 provide feedback to the topic model with respect to a given document or topic, data structures ingested by the topic modeling module 520 can be updated to prepare for the next iteration. For example, using topic relevance feedback 513 from the user 501, the topic modeling algorithm 517 can constantly learn and update feature weights throughout each iteration. Each time topic relevance feedback 513 is received from the user 501, topic descriptors of a rejected topic model can be penalized, while topic descriptors for topics receiving positive feedback can be boosted. Keywords appearing in different sets of topic descriptors that are boosted and penalized at the same time may result in a smaller amount of a boost or penalty accordingly as both the increase and decrease may partially or fully offset each other during the subsequent iteration of the topic modeling.

During the subsequent iteration of topic modeling, the topic modeling algorithm 517 may take into account both changes to the topic modeling parameters 515 and the topic relevance feedback 513. Under-performing topic models may be relearned or adjusted, while positively viewed topic models are improved, and optimized. During the next round of topic modeling, keyword boosts and penalties are applied to all words in all of the documents that form the dataset 521. Keywords that are consistently penalized may be removed from consideration during the next iteration. Moreover, parameter changes 509 are also applied. For example, feature weights may be updated, thresholds for the topic size and/or number of topics may be applied and the topic modeling algorithm 517 models the topics of the dataset 521 again. Once modeled, the topic modeling results for the newest iteration is outputted as visual output 530 for the user 501 to explore, interact with, and adjust.

Method for Controlling and Visualizing Topic Modeling Results

Figure 11A:
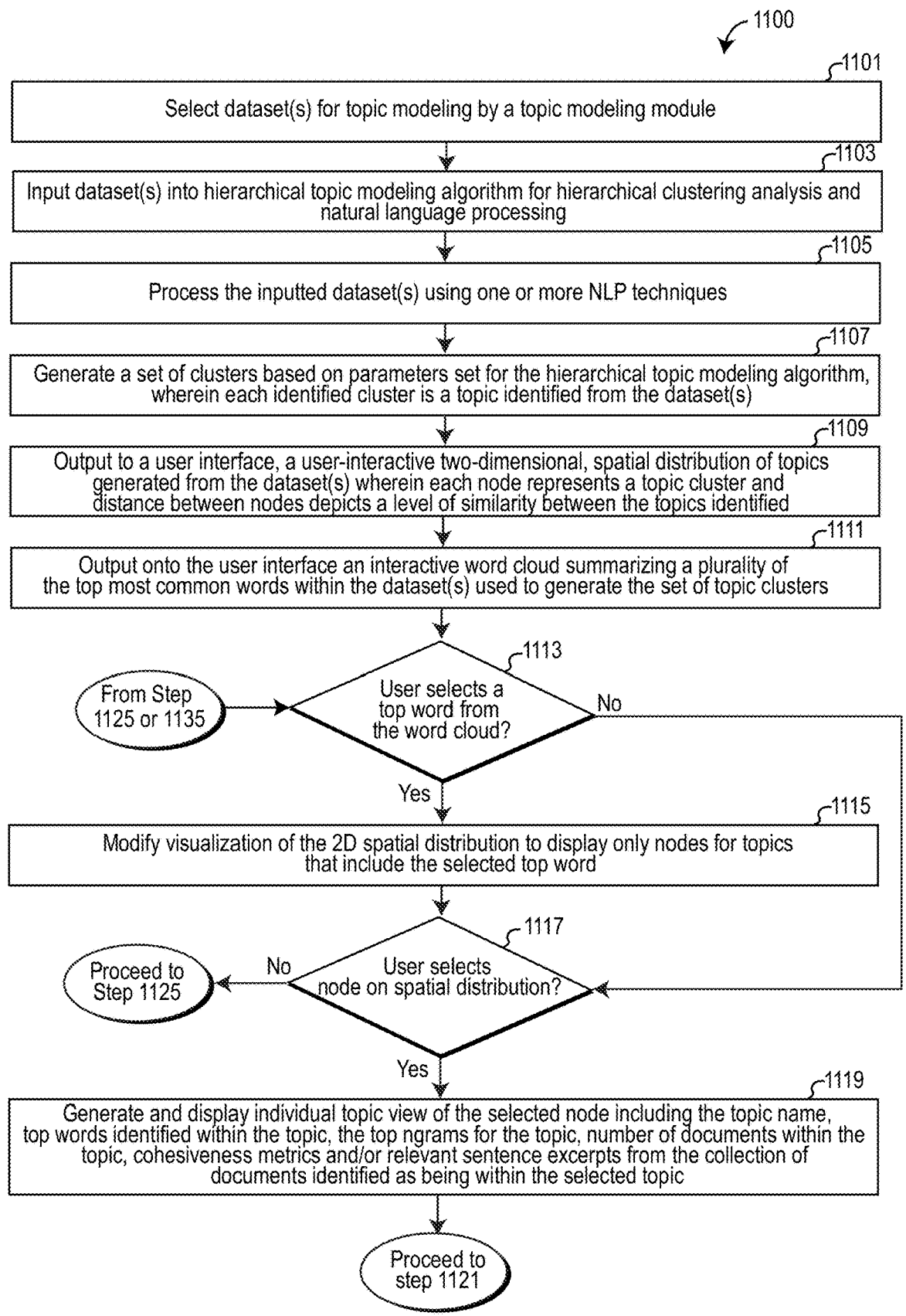
FIG. 11A depicts a flow diagram describing an embodiment of a method for visualizing and controlling a topic modeling algorithm in accordance with the present disclosure.
Figure 11B:
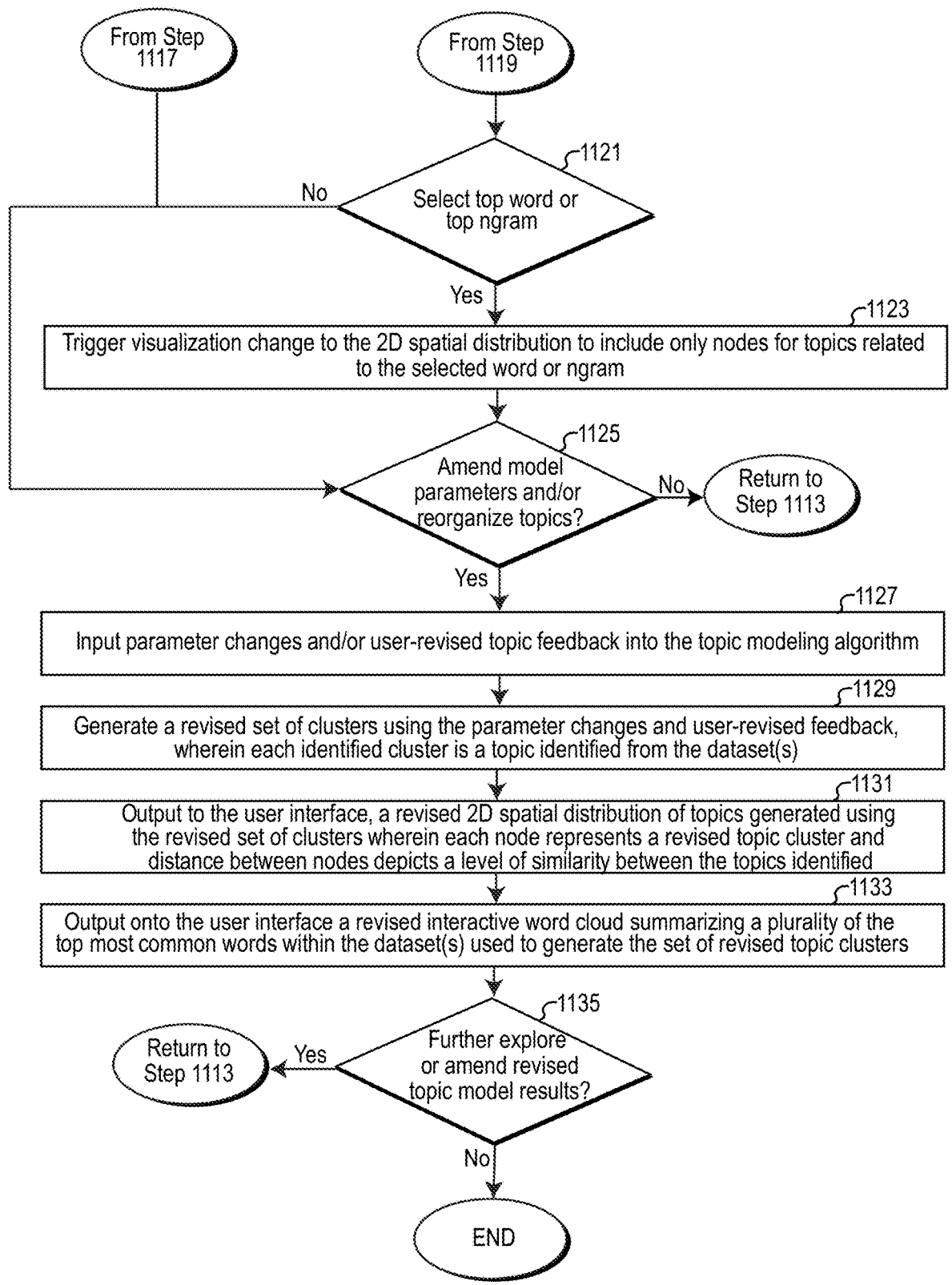
FIG. 11B depicts a flow diagram depicting a continuation of the embodiment of the method for visualizing and controlling the topic model algorithm of FIG. 11A.

The drawings of FIGS. 11A-11B represent embodiments of methods for controlling and visualizing topic modeling results in a transparent manner, in accordance with FIGS. 3-10 described above, using one or more computing systems defined generically by computing system 100 of FIGS. 1-2; and more specifically by the embodiments of the specialized systems and/or computing environments depicted in FIGS. 3-10 and as described herein. A person skilled in the art should recognize that the steps of the method described in FIGS. 11A-11B may be performed in a different order than presented and may not require all the steps described herein to be performed.

The embodiment of method 1100 described by FIG. 11A may begin at step 1101. During step 1101 a topic modeling module 520 may select one or more dataset(s) 521 for topic modeling. Each of the dataset(s) 521 may comprise a collection of documents for modeling by one or more topic modeling algorithms 517 and/or processing using natural language processing. In step 1103, dataset(s) 521 are inputted into the topic modeling algorithm 517 for topic modeling, using hierarchical clustering analysis, LDA or other methods for modeling the dataset(s) 521 and/or natural language processing using one or more NLP techniques. In step 1105, the dataset(s) 521 inputted into the topic modeling algorithm 517 may be processed by an NLP module 519 using one or more NLP techniques. Using the output from the NLP module 519, in step 1107, topic modeling algorithm 517 may generate a set of clusters based on the initial parameters of the topic modeling algorithm 517, wherein each identified cluster within the set of clusters represents a topic identified and/or extracted from one or more dataset(s) 521.

In step 1109, embodiments of the topic modeling module 520 may output to a user interface 510 visual output 530 comprising a plurality of graphical elements 529 and/or explanatory elements 523. In the exemplary embodiment, the visual output 530 constructed by the topic modeling module 520 may include a user-interactive 2D spatial distribution 720 of topics generated from the dataset(s) 521. Each node 711 of the 2D spatial distribution 720 being displayed by the user interface 510 may represent a topic cluster, and the distance between the nodes represents a level of similarity between the identified topics, wherein nodes 711 closer together are more similar and nodes 711 further away are less similar. Moreover, in step 1111, the topic modeling module 520 may output to the user interface 510 an interactive word cloud 901 summarizing a plurality of the topmost common words within the dataset(s) 521 use to generate the set of topic clusters represented by the nodes 711 of the 2D spatial distribution 720.

In step 1113, a determination is made whether or not a user 501 selects a top word from the word cloud 901 by interacting with the user interface 510. If one or more top words from the word cloud 901 have not been selected via the user interface 510 by a user 501, the method 1100 may proceed to step 1117. Otherwise, if a user has interacted with the word cloud 901 being displayed by the user interface 510 and selected one or more top words displayed by the word cloud 901, the method 1100 may proceed to step 1115. During step 1115, in response to the user selection of one or more words from the word cloud 901 via the user interface 510, the visualization of the 2D spatial distribution 720 of topics may be modified to display only nodes 711 for topics that include the selected top word, and remove from display by the 2D spatial distribution 720 any nodes 711 that are not associated with the selected word.

In step 1117 of method 1100, a determination is made whether or not a user interacting with the user interface 510 has selected one or more nodes 711 on the 2D spatial distribution of topics being displayed by the user interface 510. If selection of one or more nodes 711 of the 2D spatial distribution 720 of topics has not been made by a user 501, the method 1100 may proceed to step 1125. Conversely, upon selection of one or more nodes 711 as a selected node 705, the method 1100 may proceed to step 1119. During step 1119, in response to the selected node 705 being selected by a user 501, an individual topic view detailing the selected node 705 may be generated and displayed by the user interface 510. Content of the individual topic view comprising both semantic 525 summaries and structural 527 attributes of the topic being selected, including (but is not limited to) the display of the topic description 717 of the selected node 705, a plurality of top words 719 identified within the topic, a plurality of top ngrams 729 for the selected topic, a total number of documents from the dataset 521 that fall within the selected topic, one or more scores 721, 722 indicating both an overall score and topic-specific score of each top word 719 and/or top ngram 729, and/or one or more cohesiveness metrics for the selected topic. In some embodiments, during step 1119, a set of relevant sentences extracted from the dataset 521 that correspond to the selected topic may be generated and displayed by the user interface 510.

During step 1121 of method 1100, a determination may be made whether or not a user interacting with the individual topic view of a selected node 705 has interactively selected a top word 719 or top ngram 729 via the user interface 510. If during step 1121, a top word 719 and/or a top ngram 729 have not been selected by a user 501 interactive with the individual topic view of a selected node 705, the method 1100 may proceed to step 1125. Conversely, if a top word 719 and/or a top ngram 729 being displayed by an individual topic view of the user interface 510 is interactively selected by a user 501, the method 1100 may proceed to step 1123. During step 1123, in response to the selection of the top word 719 or top ngram 729 by the user 501 interacting with the user interface 510, a dynamic visualization change to the 2D spatial distribution 720 of topics may be reflected by the user interface 510. The visualization change to the 2D spatial distribution 720 of topics may display only nodes 711 related to the selected top word 719 or top ngram 729.

During step 1125 of method 1100, a determination may be made whether or not a user 501 interacting with the user interface 510 has inputted a change to the topic model parameters 515, reorganized one or more topics (i.e., by splitting or merging topics) and/or provided topic relevance feedback 513. If no topic modeling parameters 515 have been changed nor have the topics been reorganized and/or topic relevance feedback 513 has not been received that would influenced the next iteration of topic modeling by topic modeling module 520, the method 1100 may return to step 1113. Otherwise, if topic modeling parameters 515 and/or topic relevance feedback 513 have been provided by the user 501 to the topic modeling module 520 as user input 505, the method may proceed to step 1127.

During step 1127, changes to the topic modeling parameters 515 and/or user-provided top relevance feedback 513 may be inputted into the topic modeling algorithm 517 for consideration and adjustments to the topic models during subsequent iterations of topic modeling by the topic modeling module 520. In step 1129. the subsequent iteration of the topic modeling results may be generated by the topic modeling algorithm 517, taking into consideration the changes to the topic modeling parameters 515 and/or topic relevance feedback provided by the user 501 to generate a revised set of clusters corresponding to topics identified from the dataset(s) 521. In step 1131, topic modeling module 520 outputs to the user interface 510 a revised 2D spatial distribution of topics that has been generated based on the revised set of clusters, wherein each node of the revised 2D spatial distribution of topics represents a revised topic cluster corresponding to a topic of the dataset 521, and the distance between nodes describes the level of similarity between the topics identified. In step 1133, the topic modeling module 520 further outputs to the user interface 510 a revised interactive world cloud summarizing a plurality of the topmost commonly used words within the dataset(s) 521 used to generate the set of revised topic clusters. In step 1135, a determination is made whether or not a user continues to further explore the revised topic modeling results outputted to the user interface in steps 1129 to 1133. If no further exploration occurs by the user 501, then the method 1100 may end. Otherwise, if the user 501 continues to interact with the revised iteration of the topic modeling results being displayed by the user interface 510, the method 1100 may return to step 1113, wherein the user can continue to explore and/or interact with the revised topic modeling results and input parameters changes and/or topic relevance feedback that may be taken into consideration during a subsequent iteration of topic modeling beyond the currently revised topic modeling results being displayed.

What is claimed is:

1. A computer-implemented method for controlling and visualizing topic modeling results, the computer-implemented method comprising:

inputting, by a processor, a dataset into a hierarchical topic modeling algorithm configured for hierarchical clustering analysis and natural language processing (NLP) of the dataset;

generating, by the processor, a set of clusters based on a first set of parameters inputted into the hierarchical modeling algorithm, wherein each cluster represents a topic identified from the dataset;

outputting, by the processor, an interactive two-dimensional (2D) spatial distribution of the set of clusters to a user interface, wherein the interactive 2D spatial distribution is obtained through a multidimensional scaling of semantic embeddings, and nodes of the interactive 2D spatial distribution each represent a cluster of the set of clusters and distance between the nodes depicts a level of similarity between topics represented by the nodes;

selecting, by the processor, a first node of the interactive 2D spatial distribution being displayed by the user interface; and in response to selecting the first node of the interactive 2D spatial distribution, visually generating, by the processor, an individual topic view of the first node based on refining the hierarchical topic modeling via an iterative interaction feedback loop, wherein the individual topic view comprising a semantic summary explaining topic definitions for the first node and structural attributes explaining how the topic of the first node differs from remaining nodes of the 2D spatial distribution.

2. The computer-implemented method of claim 1, wherein the topic definitions of the semantic summary are obtained from the NLP processing of the dataset and are selected from the group consisting of part-of-speech (POS) annotated keywords, ngrams, relevant sentences and a combination thereof.

3. The computer-implemented method of claim 1, wherein the structural attributes being displayed by the individual topic view are selected from the group consisting of a total number of documents from the dataset within the first node, a measure of cohesiveness based on document feature vectors, a measure of cohesiveness based on BERT embeddings of sentences within the dataset, and a combination thereof.

4. The computer-implemented method of claim 1, further comprising:
  selecting, by the processor, a top word or a top ngram from the individual topic view of the first node; and
  in response to selecting the top word or the top ngram from the individual topic view, triggering, by the processor, a visualization change to the interactive 2D spatial distribution, wherein the nodes of the interactive 2D spatial distribution being displayed are only nodes for topics containing the top word or the top ngram that was selected from the individual topic view.

5. The computer-implemented method of claim 1 further comprising:
  amending, by the processor, via the user interface, the first set of parameters inputted into the hierarchical modeling algorithm into a second set of parameters inputted into the hierarchical modeling algorithm;
  generating, by the processor, a revised set of clusters using the second set of parameters inputted into the hierarchical algorithm; and
  outputting, by the processor, a revised interactive 2D spatial distribution of the revised set of clusters to the user interface, wherein each revised cluster represents a topic identified from the dataset.

6. The computer-implemented method of claim 1 further comprising:
  inputting, by the processor, user topic feedback into the hierarchical modeling algorithm, wherein the user topic feedback is inputted via the user interface by splitting topics displayed by the user interface into multiple topics or merging a single topic displayed by the user interface into a plurality of topics;
  generating, by the processor, a revised set of clusters using the user topic feedback inputted into the hierarchical algorithm; and
  outputting, by the processor, a revised interactive 2D spatial distribution of the revised set of clusters to the user interface, wherein each revised cluster represents a topic identified from the dataset.

7. The computer-implemented method of claim 1, further comprising:
  outputting, by the processor, a word cloud to the user interface, said word cloud comprising a set of topmost commonly used words within the dataset;
  selecting, by the processor, a first word from the word cloud via the user interface; and
  in response to selecting the first word from the word cloud, modifying, by the processor, visualization of the interactive 2D spatial distribution on the user interface by displaying only nodes for the topics containing the first word selected from the word cloud.

8. A computer system for controlling and visualizing topic modeling results comprising:
  a processor; and
  a computer-readable storage media coupled to the processor, wherein the computer-readable storage media contains program instructions executing, via the processor, a computer-implemented method comprising:
    inputting, by the processor, a dataset into a hierarchical topic modeling algorithm configured for hierarchical clustering analysis and natural language processing (NLP) of the dataset;
    generating, by the processor, a set of clusters based on a first set of parameters inputted into the hierarchical modeling algorithm, wherein each cluster represents a topic identified from the dataset;
    outputting, by the processor, an interactive two-dimensional (2D) spatial distribution of the set of clusters to a user interface, wherein the interactive 2D spatial distribution is obtained through a multidimensional scaling of semantic embeddings, and nodes of the interactive 2D spatial distribution each represent a cluster of the set of clusters and distance between the nodes depicts a level of similarity between topics represented by the nodes;
    selecting, by the processor, a first node of the interactive 2D spatial distribution being displayed by the user interface; and
    in response to selecting the first node of the interactive 2D spatial distribution, visually generating, by the processor, an individual topic view of the first node based on refining the hierarchical topic modeling via an iterative interaction feedback loop, wherein the individual topic view comprises a semantic summary explaining topic definitions for the first node and structural attributes explaining how the topic of the first node differs from remaining nodes of the 2D spatial distribution.

9. The computer system of claim 8, wherein the topic definitions of the semantic summary are obtained from the NLP processing of the dataset and are selected from the group consisting of part-of-speech (POS) annotated keywords, ngrams, relevant sentences and a combination thereof.

10. The computer system of claim 8, wherein the structural attributes being displayed by the individual topic view are selected from the group consisting of a total number of documents from the dataset within the first node, a measure of cohesiveness based on document feature vectors, a measure of cohesiveness based on BERT embeddings of sentences within the dataset, and a combination thereof.

11. The computer system of claim 8, further comprising:
  selecting, by the processor, a top word or a top ngram from the individual topic view of the first node; and
  in response to selecting the top word or the top ngram from the individual topic view, triggering, by the processor, a visualization change to the interactive 2D spatial distribution, wherein the nodes of the interactive 2D spatial distribution being displayed are only nodes for topics containing the top word or the top ngram that was selected from the individual topic view.

12. The computer system of claim 8, further comprising:
  amending, by the processor, via the user interface, the first set of parameters inputted into the hierarchical modeling algorithm into a second set of parameters inputted into the hierarchical modeling algorithm;
  generating, by the processor, a revised set of clusters using the second set of parameters inputted into the hierarchical algorithm; and outputting, by the processor, a revised interactive 2D spatial distribution of the revised set of clusters to the user interface, wherein each revised cluster represents a topic identified from the dataset.

13. The computer system of claim 8, further comprising:
inputting, by the processor, user topic feedback into the hierarchical modeling algorithm, wherein the user topic feedback is inputted via the user interface by splitting topics displayed by the user interface into multiple topics or merging a single topic displayed by the user interface into a plurality of topics;
generating, by the processor, a revised set of clusters using the user topic feedback inputted into the hierarchical algorithm; and
outputting, by the processor, a revised interactive 2D spatial distribution of the revised set of clusters to the user interface, wherein each revised cluster represents a topic identified from the dataset.

14. The computer system of claim 8, further comprising:
outputting, by the processor, a word cloud to the user interface, said word cloud comprising a set of topmost commonly used words within the dataset;
selecting, by the processor, a first word from the word cloud via the user interface; and
in response to selecting the first word from the word cloud, modifying, by the processor, visualization of the interactive 2D spatial distribution on the user interface by displaying only nodes for the topics containing the first word selected from the word cloud.

15. A computer program product for controlling and visualizing topic modeling results comprising:
one or more computer readable storage media having computer-readable program instructions stored on the one or more computer readable storage media, said program instructions executes a computer-implemented method comprising:
inputting, by a processor, a dataset into a hierarchical topic modeling algorithm configured for hierarchical clustering analysis and natural language processing (NLP) of the dataset;
generating, by the processor, a set of clusters based on a first set of parameters inputted into the hierarchical modeling algorithm, wherein each cluster represents a topic identified from the dataset;
outputting, by the processor, an interactive two-dimensional (2D) spatial distribution of the set of clusters to a user interface, wherein the interactive 2D spatial distribution is obtained through a multidimensional scaling of semantic embeddings, and nodes of the interactive 2D spatial distribution each represent a cluster of the set of clusters and distance between the nodes depicts a level of similarity between topics represented by the nodes;
selecting, by the processor, a first node of the interactive 2D spatial distribution being displayed by the user interface; and
in response to selecting the first node of the interactive 2D spatial distribution, visually generating, by the processor, an individual topic view of the first node based on refining the hierarchical topic modeling via an iterative interaction feedback loop, wherein the individual topic view comprises a semantic summary explaining topic definitions for the first node and structural attributes explaining how the topic of the first node differs from remaining nodes of the 2D spatial distribution.

16. The computer program product of claim 15, wherein the topic definitions of the semantic summary are obtained from the NLP processing of the dataset and are selected from the group consisting of part-of-speech (POS) annotated keywords, ngrams, relevant sentences and a combination thereof.

17. The computer program product of claim 15, further comprising:
selecting, by the processor, a top word or a top ngram from the individual topic view of the first node; and
in response to selecting the top word or the top ngram from the individual topic view, triggering, by the processor, a visualization change to the interactive 2D spatial distribution, wherein the nodes of the interactive 2D spatial distribution being displayed are only nodes for topics containing the top word or the top ngram that was selected from the individual topic view.

18. The computer program product of claim 15, further comprising:
amending, by the processor, via the user interface, the first set of parameters inputted into the hierarchical modeling algorithm into a second set of parameters inputted into the hierarchical modeling algorithm;
generating, by the processor, a revised set of clusters using the second set of parameters inputted into the hierarchical algorithm; and
outputting, by the processor, a revised interactive 2D spatial distribution of the revised set of clusters to the user interface, wherein each revised cluster represents a topic identified from the dataset.

19. The computer program product of claim 15, further comprising:
inputting, by the processor, user topic feedback into the hierarchical modeling algorithm, wherein the user topic feedback is inputted via the user interface by splitting topics displayed by the user interface into multiple topics or merging a single topic displayed by the user interface into a plurality of topics;
generating, by the processor, a revised set of clusters using the user topic feedback inputted into the hierarchical algorithm; and
outputting, by the processor, a revised interactive 2D spatial distribution of the revised set of clusters to the user interface, wherein each revised cluster represents a topic identified from the dataset.

20. The computer program product of claim 15 further comprising:
outputting, by the processor, a word cloud to the user interface, said word cloud comprising a set of topmost commonly used words within the dataset;
selecting, by the processor, a first word from the word cloud via the user interface; and
in response to selecting the first word from the word cloud, modifying, by the processor, visualization of the interactive 2D spatial distribution on the user interface by displaying only nodes for the topics containing the first word selected from the word cloud.

* * * * *